(12) United States Patent
Suzuki

(10) Patent No.: US 9,081,192 B2
(45) Date of Patent: Jul. 14, 2015

(54) OPTICAL SCANNING DEVICE, AND IMAGE FORMING APPARATUS

(71) Applicant: FUJI XEROX CO., LTD., Tokyo (JP)

(72) Inventor: Yoshiyuki Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/907,071

(22) Filed: May 31, 2013

(65) Prior Publication Data

US 2014/0139602 A1 May 22, 2014

(30) Foreign Application Priority Data

Nov. 20, 2012 (JP) ................................. 2012-254566

(51) Int. Cl.
*B41J 15/14* (2006.01)
*B41J 27/00* (2006.01)
*G02B 26/12* (2006.01)

(52) U.S. Cl.
CPC .................................... *G02B 26/127* (2013.01)

(58) Field of Classification Search
USPC ......... 347/229, 231–235, 241–244, 248–250, 347/256–261; 359/203.1, 204.1, 359/205.1–207.6, 216.1–219.1
See application file for complete search history.

(56) References Cited

U.S. PATENT DOCUMENTS

| | | | |
|---|---|---|---|
| 6,833,939 B1 | 12/2004 | Ichikawa | |
| 8,305,416 B2 * | 11/2012 | Maeda | 347/237 |
| 2007/0206261 A1 * | 9/2007 | Hayashi et al. | 359/218 |
| 2008/0042049 A1 * | 2/2008 | Suzuki | 250/216 |
| 2008/0055692 A1 * | 3/2008 | Saisho et al. | 359/205 |
| 2009/0002474 A1 | 1/2009 | Ishibe | |
| 2009/0123179 A1 * | 5/2009 | Tanimura | 399/151 |
| 2009/0322846 A1 | 12/2009 | Kashimura | |
| 2013/0057890 A1 * | 3/2013 | Kudo | 358/1.13 |

FOREIGN PATENT DOCUMENTS

| | | |
|---|---|---|
| JP | A-2001-215423 | 8/2001 |
| JP | A-2009-8896 | 1/2009 |
| JP | A-2010-8605 | 1/2010 |

* cited by examiner

*Primary Examiner* — Hai C Pham
(74) *Attorney, Agent, or Firm* — Oliff PLC

(57) ABSTRACT

An optical scanning device includes a light source, a scanning portion that includes plural reflection surfaces, makes light beams incident to the reflection surface such that optical axis directions of the light beams emitted from the light emitting parts are tilted with respect to a direction perpendicular to the reflection surface, and scans the light beams in the main scanning direction through rotation, an optical system that includes an optical member made of a resin, is disposed between the scanning portion and the surface to be scanned, and makes the plural light beams incident to the surface to be scanned such that optical axes of the plural light beams are parallel to each other, and a correction portion that is provided in the optical system, and corrects positional deviation of scanning lines of the light beams in the sub-scanning direction on the surface to be scanned.

5 Claims, 16 Drawing Sheets

US 9,081,192 B2

OPTICAL SCANNING DEVICE, AND IMAGE FORMING APPARATUS

CROSS-REFERENCE TO RELATED APPLICATIONS

This application is based on and claims priority under 35 USC 119 from Japanese Patent Application No. 2012-254566 filed Nov. 20, 2012.

BACKGROUND

Technical Field

The present invention relates to an optical scanning device, and an image forming apparatus.

SUMMARY

According to an aspect of the invention, there is provided an optical scanning device including a light source that includes a string of plural light emitting parts provided with a gap in a main scanning direction of a surface to be scanned, is disposed in plurality in a sub-scanning direction and emits light beams, a scanning portion that includes plural reflection surfaces arranged in a circumferential direction with respect to a rotation axis, makes the light beams incident to the reflection surface such that optical axis directions of the light beams emitted from the plural light emitting parts are tilted with respect to a direction perpendicular to the reflection surface, and scans the light beams in the main scanning direction through rotation, an optical system that includes an optical member made of a resin, is disposed between the scanning portion and the surface to be scanned, and makes the plural light beams incident to the surface to be scanned such that optical axes of the plural light beams are parallel to each other, and a correction portion that is provided in the optical system, and corrects positional deviation of scanning lines of the light beams in the sub-scanning direction on the surface to be scanned.

BRIEF DESCRIPTION OF THE DRAWINGS

Exemplary embodiments of the present invention will be described in detail based on the following figures, wherein.

DETAILED DESCRIPTION

An example of the optical scanning device and the image forming apparatus according to the present exemplary embodiment will be described.

Overall Configuration

Figure 1:
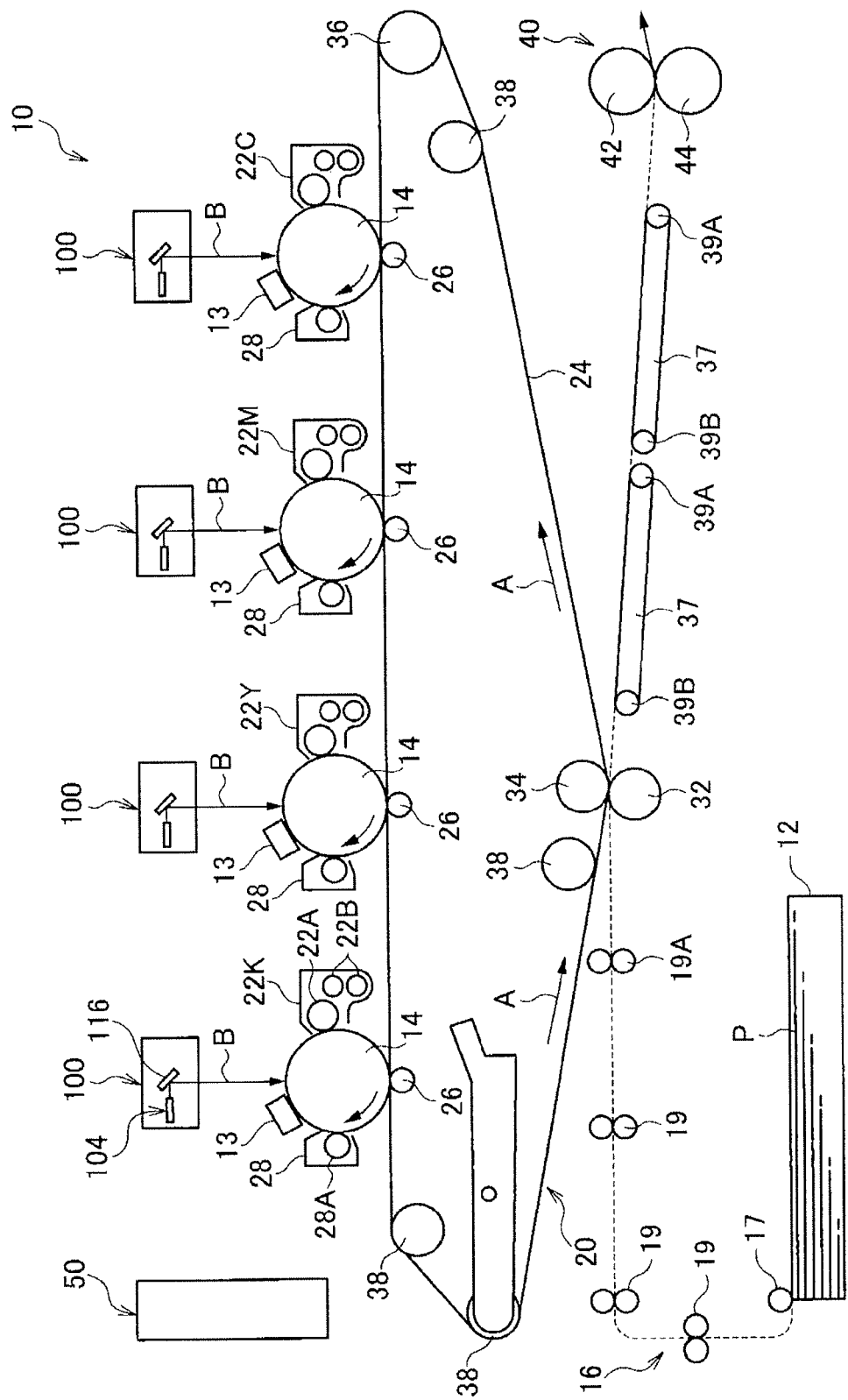
FIG. 1 is an overall configuration diagram of an image forming apparatus according to the present exemplary embodiment.

FIG. 1 shows an image forming apparatus 10 as an example of the present exemplary embodiment. The image forming apparatus 10 includes a paper accommodation portion 12 which accommodates recording paper P which is an example of the recording medium, a photoconductor 14 of which an outer circumferential surface is charged by a charging portion 13 and which is an example of a surface to be scanned, an optical scanning device 100 which scans laser beams B which are an example of the light beams on the outer circumferential surface of the photoconductor 14, and an image forming portion 20 which develops a latent image on the photoconductor 14 formed by the laser beams B from the optical scanning device 100 with a developer (toner) so as to be transferred to the recording paper P, thereby forming an image.

In addition, the image forming apparatus 10 includes a transport portion 16 which transports the recording paper P from the paper accommodation portion 12 to the image forming portion 20, a fixing device 40 which fixes a toner image formed by the image forming portion 20 to the recording paper P, a discharge portion (not shown) which discharges the recording paper P to which the toner image is fixed by the fixing device 40, and a controller 50 which controls an operation of each portion of the image forming apparatus 10.

In addition, the image forming apparatus 10 forms an image by using four colors including cyan (C), magenta (M), yellow (Y), and black (K), or only black (K), as an example, and the charging portion 13, the photoconductor 14, a primary transfer roller 26 described later, a cleaning unit 28 described later, and the optical scanning device 100 are provided singly for each color. In addition, the respective members are disposed in order of cyan (C), magenta (M), yellow (Y), and black (K) in a movement direction of an intermediate transfer belt 24 described later. In addition, configurations of the respective members are the same regardless of toner colors, and, thus, in the following description, C, M, Y and K are added to the ends of the reference numerals in a case where the toner colors are required to be differentiated from each other, and C, M, Y and K are omitted in a case where the toner colors are not required to be differentiated from each other.

The image forming portion 20 includes developing units 22C, 22M, 22Y and 22K which develop latent images of the outer circumferential surface of the photoconductor 14 with toners of respective colors including cyan (C), magenta (M), yellow (Y), and black (K), the intermediate transfer belt 24 to which the toner images formed by the developing units 22C, 22M, 22Y and 22K are sequentially transferred, the primary transfer rollers 26 which transfer the toner images formed by the developing units 22C, 22M, 22Y and 22K to the intermediate transfer belt 24, and a secondary transfer roller 32 which transfers the toner images transferred to the intermediate transfer belt 24 to the recording paper P.

The photoconductor 14 has a configuration in which a photoconductive layer is provided on a surface of a conductive supporter, and holds an electrostatic latent image (an example of the latent image) and rotates at preset rotation speed. In addition, around each photoconductor 14, the charging portion 13, the developing unit 22, and the cleaning unit 28 are provided in this order from the upstream side in the rotation direction (clockwise direction in FIG. 1) of the photoconductor 14. Further, the laser beams B emitted from the optical scanning device 100 are incident to the outer circumferential surface of the photoconductor 14 between the charging portion 13 and the developing unit 22.

The charging portion 13 is, for example, a scorotron type charging portion, and charges the outer circumferential surface of the photoconductor 14 with the same polarity (for example, a negative polarity) as the charge polarity of the toner, through discharging caused by applying a voltage.

The developing unit 22 includes a developing roller 22A which is rotatably provided and supplies a developer (for example, toner) to the photoconductor 14, and plural transport members 22B which agitate the developer supplied to the developing roller 22A and circularly transport the developer.

The cleaning unit 28 includes a cleaning blade (not shown) and a brush roller 28A, and scrapes out remaining toner or paper dust attached to the outer circumferential surface of the photoconductor 14 after primary transfer.

The intermediate transfer belt 24 is supported by an opposite roller 34 opposite to the secondary transfer roller 32, a driving roller 36 which drives the intermediate transfer belt 24 in the arrow A direction (the counterclockwise direction in FIG. 1), and plural supporting rollers 38, located inside the intermediate transfer belt 24. In addition, the intermediate transfer belt 24 comes into contact with the photoconductors 14 and circularly moves in one direction (the arrow A direction).

The primary transfer roller 26 is opposite to the photoconductor 14 with the intermediate transfer belt 24 interposed therebetween. A primary transfer position (not shown) where a toner image on the photoconductor 14 is primarily transferred to the intermediate transfer belt 24 is formed between the primary transfer roller 26 and the photoconductor 14. At the primary transfer position, the primary transfer roller 26 transfers the toner image on the surface (the outer circumferential surface) of the photoconductor 14 to the intermediate transfer belt 24 by the contact pressure and the electrostatic force.

The secondary transfer roller 32 is opposite to the opposite roller 34 with the intermediate transfer belt 24 interposed therebetween as described above. A secondary transfer position (not shown) where the toner image on the intermediate transfer belt 24 is secondarily transferred to the recording paper P is formed between the secondary transfer roller 32 and the opposite roller 34.

The transport portion 16 includes a delivery roller 17 which delivers the recording paper P accommodated in the paper accommodation portion 12, and plural pairs of transport rollers 19 which nip and transport the recording paper P delivered by the delivery roller 17 to the secondary transfer position. In addition, the rollers closest to the secondary transfer roller 32 among the plural pairs of transport rollers 19 are a pair of alignment rollers 19A which send the recording paper P to the secondary transfer position at set timing.

The fixing device 40 is provided further toward the downstream side in the transport direction than the secondary transfer position, and includes a heating roller 42 which has a heat source (for example, a halogen lamp) therein, and a pressing roller 44 which presses the recording paper P interposed between the pressing roller 44 and the heating roller 42. The heating roller 42 is provided on a toner image surface side of the recording paper P.

A transport belt 37 which transports the recording paper P to the fixing device 40 is provided further toward the downstream side in the transport direction than the secondary transfer position and further toward the upstream side in the transport direction than the fixing device 40. The transport belt 37 is supported by a driving roller 39A and a supporting roller 39B so as to be rotatably moved.

Image Forming Operation

With the above-described configuration, in the image forming apparatus 10, first, the recording paper P delivered from the paper accommodation portion 12 is sent to the secondary transfer position by the pairs of transport rollers 19 (the pair of alignment rollers 19A)

On the other hand, toner images of the respective colors formed on the outer circumferential surfaces of the respective photoconductors 14 are overlapped on the intermediate transfer belt 24 and thus a multi-color image is formed. In addition, the multi-color image formed on the intermediate transfer belt 24 is transferred onto the recording paper P which is sent to the secondary transfer position.

The recording paper P to which the multi-color image is transferred is transported to the fixing device 40, and the transferred multi-color image is fixed by the fixing device 40. In addition, the recording paper P to which the multi-color image is fixed is discharged to a paper discharge portion (not shown). In this way, a series of image forming operations of the image forming apparatus 10 is performed.

Configuration of Main Portion

Next, the optical scanning device 100 will be described.

Figure 2:
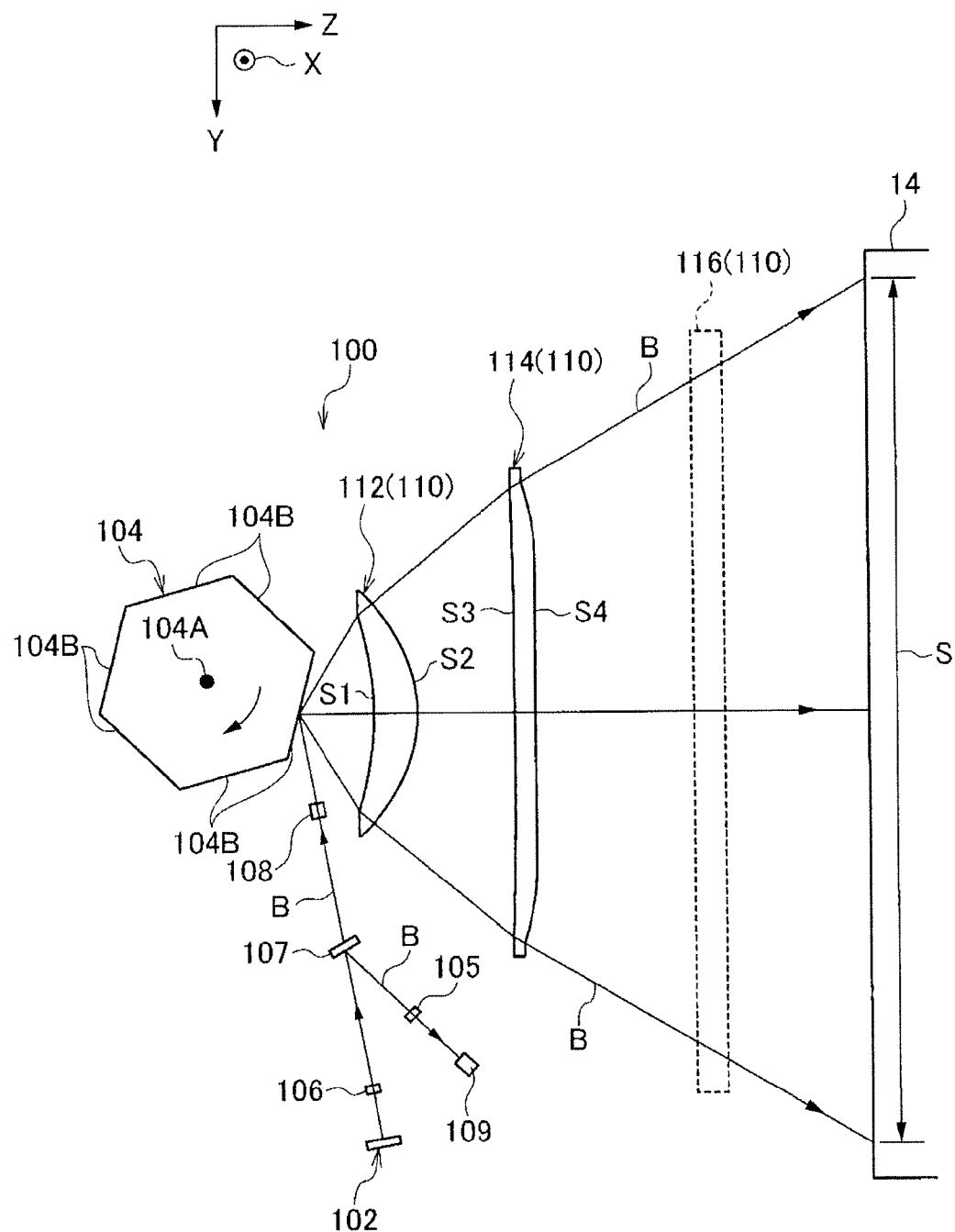
FIG. 2 is a configuration diagram of an optical scanning device according to the present exemplary embodiment.

As shown in FIG. 2, the optical scanning device 100 includes a light source 102 which emits laser beams B which are an example of light beams, a polygon mirror 104 which is an example of the scanning portion and scans the laser beams B in a main scanning direction (the Y direction in FIG. 2) of the photoconductor 14 through rotation, an optical system 110 disposed between the polygon mirror 104 and the photoconductor 14, and entrance surfaces S1 and S3 and exit surfaces S2 and S4 which are an example of the correction portion, are provided in the optical system 110, and correct positional deviation of scanning lines of the laser beams B in a sub-scanning direction (the X direction in FIG. 2 which is a rotation direction of the photoconductor 14) in the photoconductor 14. In addition, the X direction and the Y direction are perpendicular to each other, and a direction perpendicular to the X direction and the Y direction is set to a Z direction (a traveling direction of light).

In addition, in the optical scanning device 100, a collimator lens 106, a half mirror 107, and a cylindrical lens 108 are provided in this order in the traveling direction (irradiation direction) of the laser beams B between the light source 102 and the polygon mirror 104, that is, on a light path from the light source 102 to the polygon mirror 104.

Figure 3:
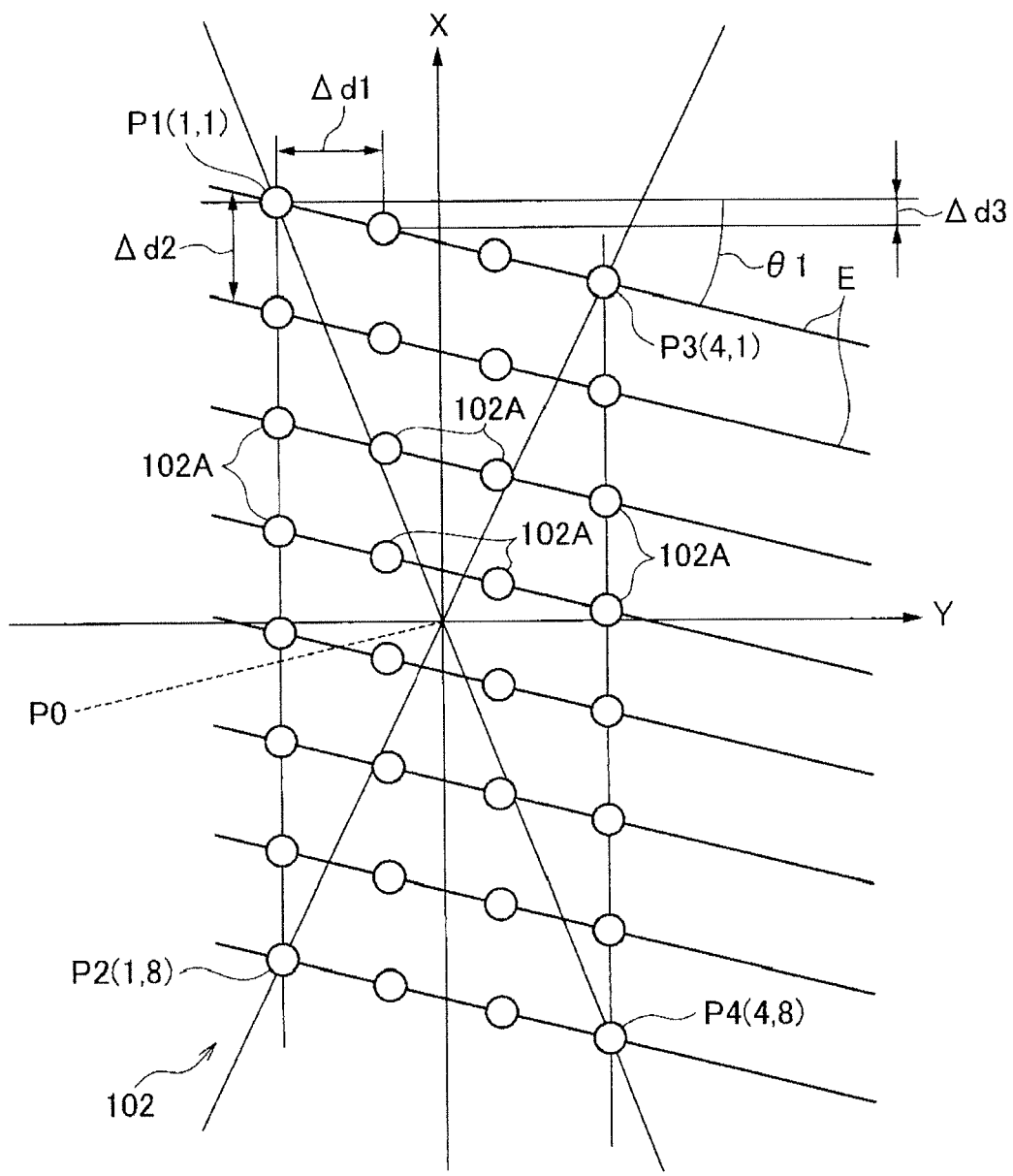
FIG. 3 is a schematic diagram of a light source according to the present exemplary embodiment.

As shown in FIG. 3, the light source 102 has a configuration in which a string of plural light emitting parts 102A which are provided with a central interval (indicated by Ad1) in the Y direction (the main scanning direction of the photoconductor 14 (refer to FIG. 2)) is disposed in plurality with a central interval (indicated by Δd2) in the X direction (the sub-scanning direction). As an example, in the light source 102, eight strings each of which has four light emitting parts 102A disposed in a two-dimensional form and arranged in the Y direction are arranged in the X direction, and thus a total of thirty-two light emitting parts 102A are provided.

In addition, the four light emitting parts 102A arranged in the Y direction are arranged on a straight line E which is tilted at an angle θ1=about 11.3[°] with respect to the Y direction. Further, as an example, the central interval Δd1 is 35 [μm], the central interval Δd2 is 18 [μm], and a central interval Δd3 in the X direction of the adjacent light emitting parts 102A on the same straight line E is 4.5 [μm]. A wavelength of the laser beams B from the light emitting parts 102A is, for example, 785 [nm].

In addition, as shown in FIG. 3, an origin P0 is set as a centroid position of the plural light emitting parts 102A, the upper left light emitting part 102A is set to P1 (1,1), the lower left light emitting part 102A is set to P2 (1,8), the upper right light emitting part 102A is set to P3 (4,1), and the lower right light emitting part 102A is set to P4 (4,8). Here, the light emitting part 102A at P1 (1,1) and the light emitting part 102A at P4 (4,8) are the light emitting parts 102A located at the outermost side in the X direction.

As shown in FIG. 2, the polygon mirror 104 includes plural reflection surfaces 104B which are arranged in the circumferential direction with respect to a rotation axis 104A which has the X direction as an axial direction, and scans the laser beams B in the Y direction of the photoconductor 14 through rotation.

Figure 5:
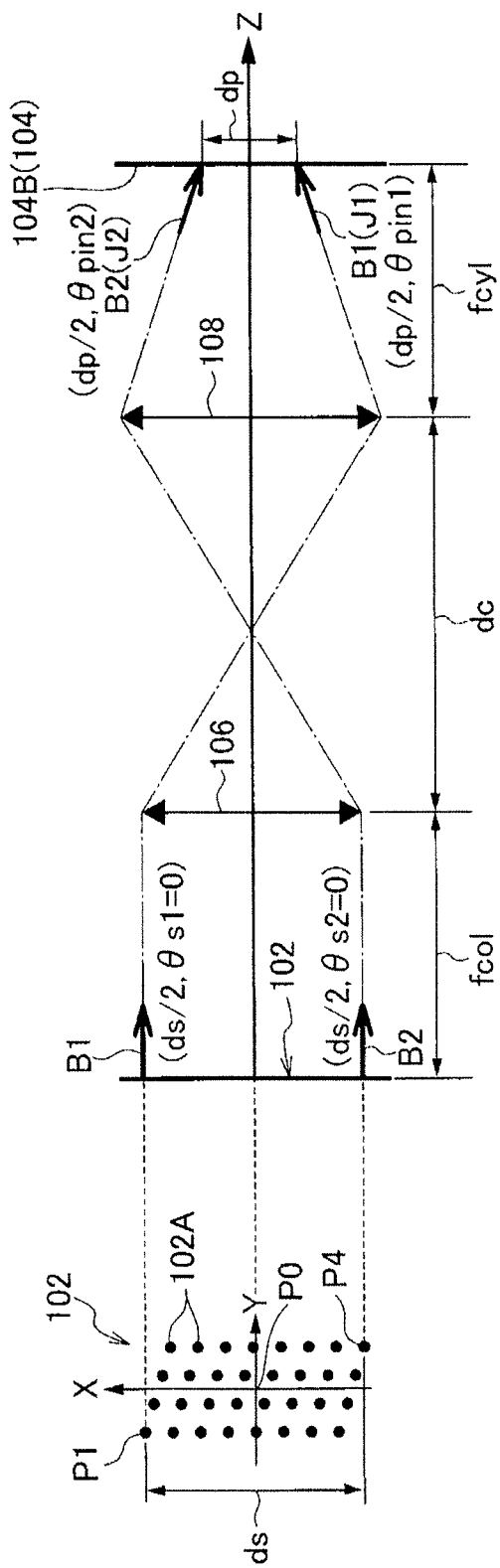
FIG. 5 is a schematic diagram illustrating a configuration from the light source to a polygon mirror according to the present exemplary embodiment.

In addition, as shown in FIG. 5, in the polygon mirror 104, the laser beams B are incident to the reflection surface 104B such that optical axis directions (the directions of the arrows J1 and J2 in FIG. 5) of the laser beams B (B1 and B2) emitted from the plural light emitting parts 102A are tilted at incidence angles $\theta p_{in}$ ($\theta p_{in}1$ and $\theta p_{in}2$) with respect to a direction (the Z direction in FIG. 5) perpendicular to the reflection surface 104B.

Specifically, in FIG. 5, the laser beam emitted from the light emitting part 102A at the outermost position P1 in the X direction is indicated by B1, and the laser beam emitted from the light emitting part 102A at the outermost position P4 is indicated by B2. In addition, the optical axis directions of the laser beams B1 and B2 are indicated by J1 and J2. Further, as an example, the light path of the laser beam B1 and the light path of the laser beam B2 are symmetrical with respect to the Z axis passing through the origin P0. Furthermore, the incidence angle of the laser beam B1 to the reflection surface 104B is indicated by $\theta p_{in}1$, and the incidence angle of the laser beam B2 to the reflection surface 104B is indicated by $\theta p_{in}2$. Details of the incidence angles $\theta p_{in}1$ and $\theta p_{in}2$ will be described later in detail.

Figure 6:
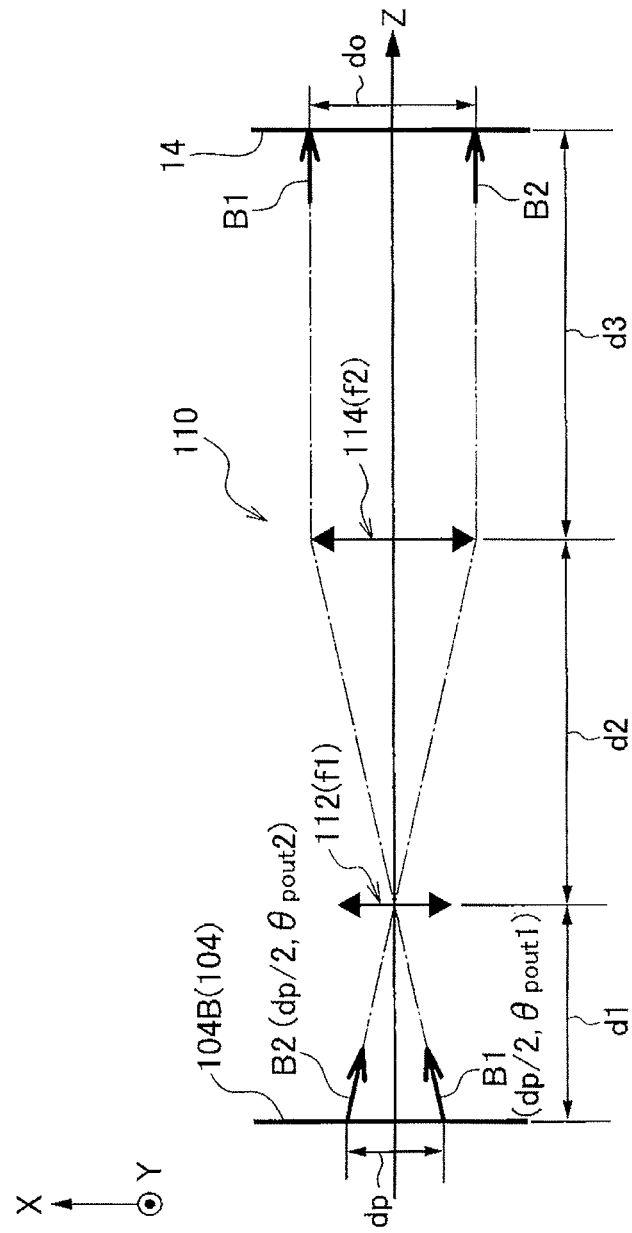
FIG. 6 is a schematic diagram illustrating a configuration from the polygon mirror to the photoconductor according to the present exemplary embodiment.

As shown in FIGS. 2, 5 and 6, plural laser beams B emitted from the light source 102 are converted into parallel beams by the collimator lens 106, and pass through slits of a slit member (not shown) so as to be formed in a predefined cross-section shape, between the light source 102 and the polygon mirror 104 in the optical scanning device 100. In addition, the collimator lens 106 makes the laser beams B converge such that the laser beams B intersect at a focal position on an image side (on a downstream side in the traveling direction of the laser beams B) of the collimator lens 106. In addition, as shown in FIG. 2, some of the plural formed laser beams B are reflected by the half mirror 107 and the others are transmitted through the half mirror 107.

The laser beams B reflected by the half mirror 107 are collected by a condensing lens 105 and are incident to a light amount detection sensor 109. In addition, a light amount in the light source 102 is detected from a light amount of the laser beams B detected by the light amount detection sensor 109, and an output thereof is adjusted. On the other hand, the plural laser beams B transmitted through the half mirror 107 are collected in the sub-scanning direction by the cylindrical lens 108, and are incident to the reflection surfaces 104B of the polygon mirror 104.

Configuration of Optical System 110

As shown in FIG. 2, the optical system 110 includes a first fθ lens 112 and a second fθ lens 114 made of plastic which are an example of the optical member made of resin, and the first fθ lens 112 and the second fθ lens 114 are disposed in this order between the polygon mirror 104 and the photoconductor 14. In addition, in the optical system 110, although details thereof are described later, the plural laser beams B are incident to the photoconductor 14 such that the respective optical axes of the plural laser beams B are parallel (hereinafter, referred to as an afocal system) to each other. This is because, even if a position of the photoconductor 14 is deviated in an imaging direction due to eccentricity, an interval between the plural laser beams B does not vary when the plural laser beams B are incident in parallel to the photoconductor 14.

In addition, the optical system 110 is provided with a reflection mirror 116 which reflects the laser beams B passing through the second fθ lens 114 toward the photoconductor 14. In addition, in FIG. 2, the second fθ lens 114, the reflection mirror 116, and the photoconductor 14 are shown on the same plane; however, practically, as shown in FIG. 1, the reflection mirror 116 reflects the laser beams B from the second fθ lens 114 toward the photoconductor 14 at almost an angle of 90° (the first fθ lens 112 and the second fθ lens 114 are not shown in FIG. 1).

First fθ Lens and Second fθ Lens

Next, setting of the first fθ lens 112 and the second fθ lens 114 will be described.

A description will be made of a configuration for achieving an afocal system by giving a power to the first fθ lens 112 and the second fθ lens 114 in the sub-scanning direction in relation to incidence of the plural laser beams B to the photoconductor 14.

Figure 4:
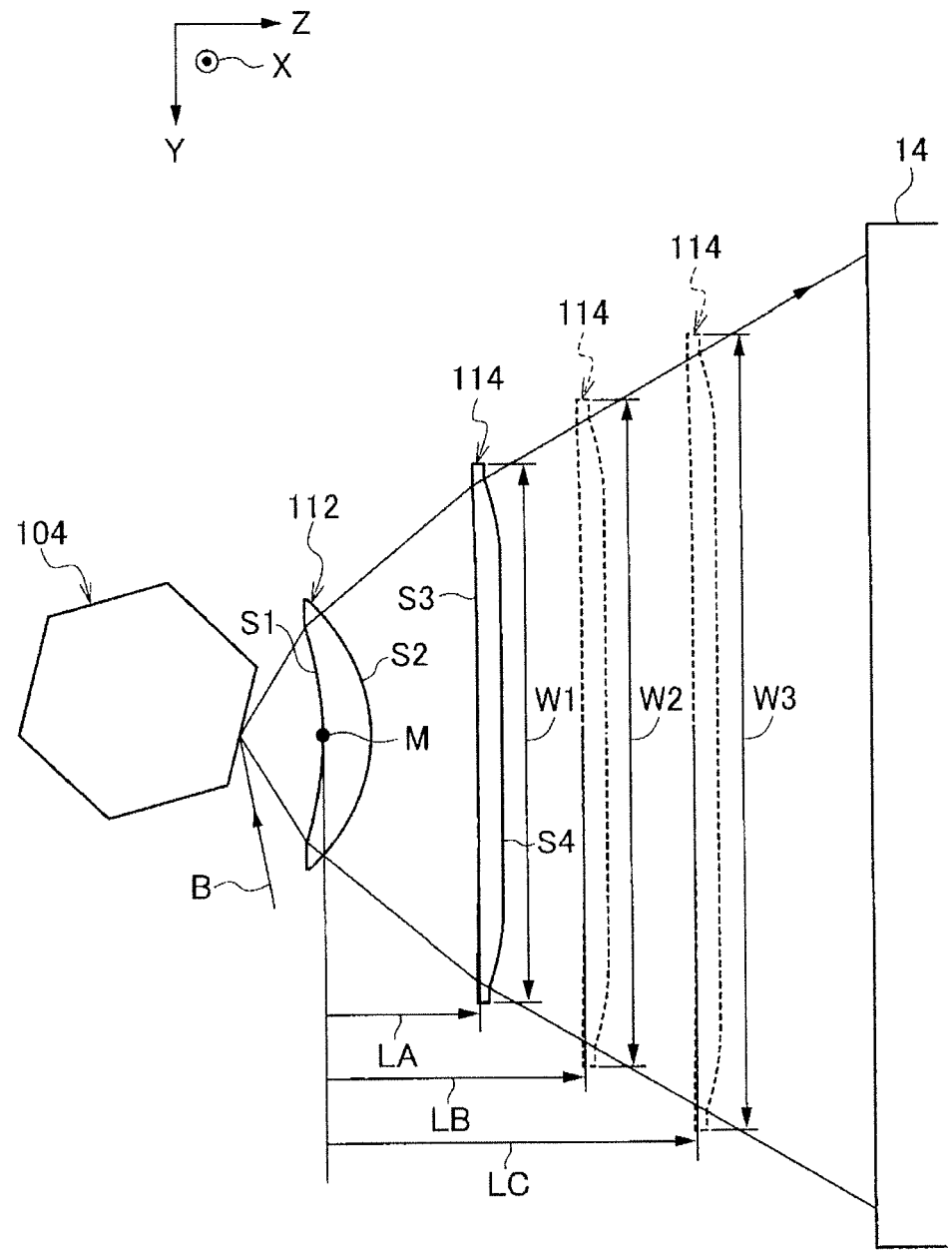
FIG. 4 is a schematic diagram illustrating that a position of a second fθ lens is changed relative to a photoconductor according to the present exemplary embodiment.

As shown in FIG. 4, the central position of the entrance surface S1 of the first fθ lens 112 in the Y direction is set to a reference position M, and distances from the reference position M to central positions of the entrance surface S3 of the second fθ lens 114 in the Y direction are set to LA, LB, and LC (LA<LB<LC). In addition, effective regions (the width W in the Y direction) required for the second fθ lens 114 in the distances LA, LB and LC are set to W1, W2, and W3. In the second fθ lens 114, the closer to the photoconductor 14, the longer the effective region, and thus W1<W2<W3. As an example, LA=51 [mm], LB=90 [mm], LC=130 [mm], W1=182 [mm], W2=253 [mm], and W3=326 [mm].

Figure 7:
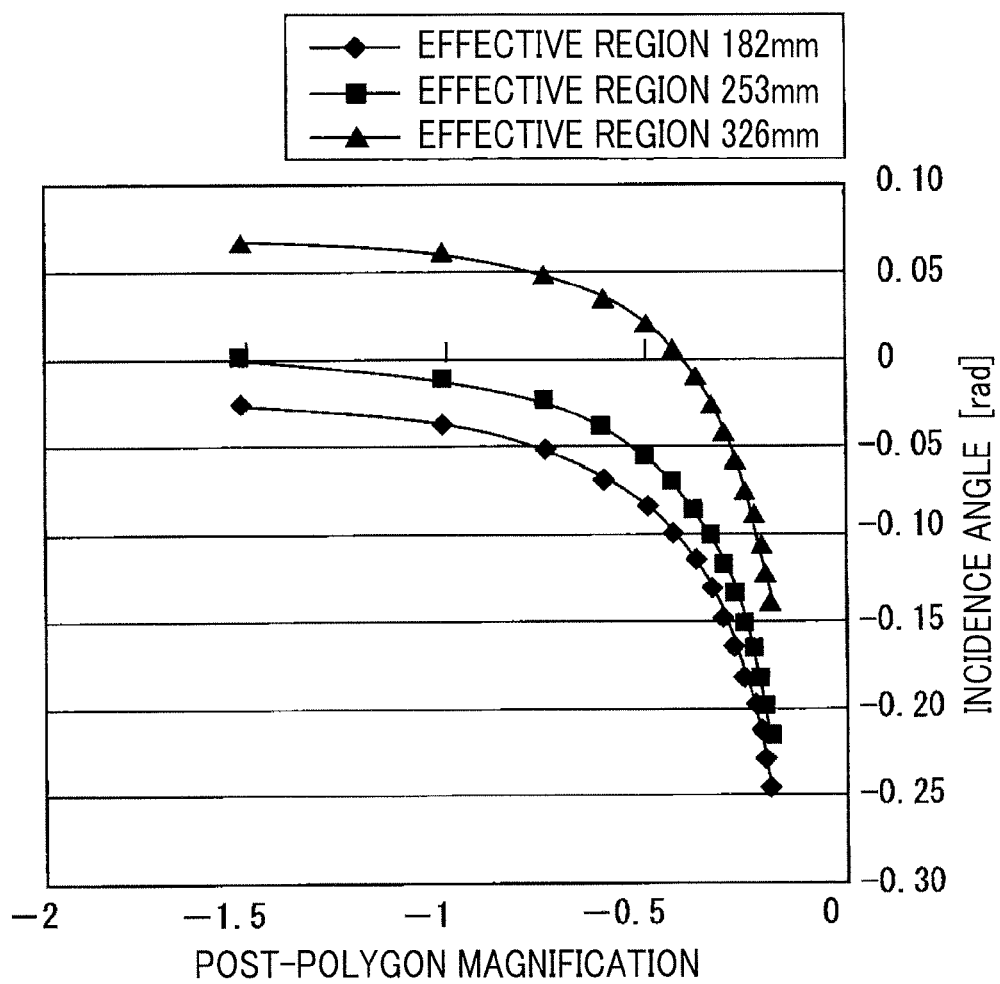
FIG. 7 is a graph illustrating a relationship between a post-polygon magnification by the optical scanning device according to the present exemplary embodiment and an incidence angle of laser beams to the photoconductor.

FIG. 7 is a graph illustrating variations in incidence angles of the laser beams B to the photoconductor 14 (refer to FIG. 4) when post-polygon magnification is changed in a state in which incidence angles of the plural laser beams B incident to the polygon mirror 104 (refer to FIG. 4) are almost 0 [rad] (parallel). The post-polygon magnification is a ratio (magnification) in the sub-scanning direction of an image on the photoconductor 14 (refer to FIG. 4) with respect to an image on the polygon mirror 104 defined by focal lengths of the first fθ lens and the second fθ lens. In addition, in FIG. 7, the effective region is changed to W1, W2 and W3, that is, a position (distance) of the second fθ lens 114 (refer to FIG. 4) is changed to LA, LB and LC.

As shown in FIG. 7, in a case of the effective region W1 (182 [mm]) in which the second fθ lens 114 (refer to FIG. 4) is distant from the photoconductor 14 (refer to FIG. 4), the curve does not intersect the line of the incidence angle 0 [rad] even if the post-polygon magnification is varied, and thus the incidence angle does not become 0 [rad] (image plane is afocal). In other words, unless the second fθ lens 114 is disposed on the photoconductor 14 side (image plane side), it is found that an afocal solution in a paraxial manner is not achieved.

On the other hand, the case where an afocal solution is achieved in a paraxial manner is a case where the curve intersects the line of 0 [rad] as in the graph of the effective region W3 (326 [mm]). Thereby, if an image plane is to be afocal, the second fθ lens 114 may be disposed at the position of the effective region W3.

However, in this case, the effective region W exceeds 200 [mm], that is, the overall length of the second fθ lens 114 increases, and, thereby, if a resin is employed, there is not only a problem in terms of costs such as a small number of cavities and a large molder but also a problem in terms of performance in which the second fθ lens 114 is likely to be bent.

Figure 9:
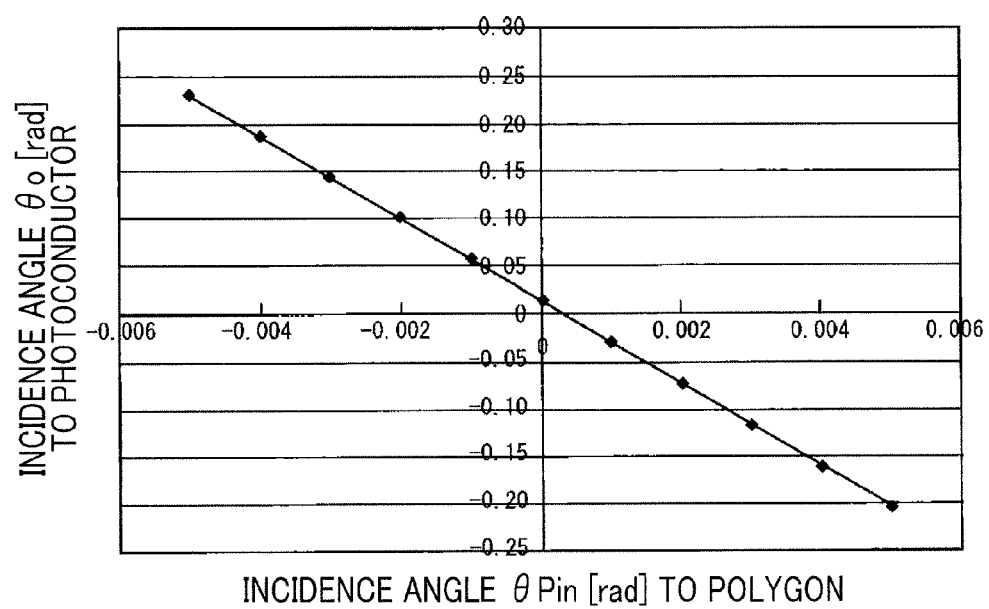
FIG. 9 is a graph illustrating variations in incidence angles of laser beams to the photoconductor when incidence angles of the laser beams to the polygon mirror according to the present exemplary embodiment vary.

Here, in FIG. 4, an incidence angle (an angle on the Y-Z plane) θo [rad] of the laser beams B to the photoconductor 14 is checked when the second fθ lens 114 is disposed at the position of the effective region W1 and the incidence angle θp$_{in}$ [rad] of the laser beams B to the polygon mirror 104 is varied, and this gives a graph shown in FIG. 9. In addition, this example is calculated in a paraxial manner, and the post-polygon magnification β=−1.322 is selected.

As shown in FIG. 9, it is found that, when the incidence angle θp$_{in}$ of the laser beams B to the polygon mirror 104 (refer to FIG. 4) is varied, there is a condition in which the incidence angle θo to the photoconductor 14 (refer to FIG. 4) is linearly varied and the incidence angle θo becomes 0 [rad]. For this reason, in FIG. 4, the second fθ lens 114 is disposed at LA=51 [mm] (the effective region W1), and an incidence angle of the laser beams B to the polygon mirror 104 is changed (tilted) from 0 [rad].

Configuration from Light Source to Polygon Mirror

FIG. 5 is a schematic diagram illustrating an arrangement of the light source 102, the collimator lens 106, the cylindrical lens 108, and the polygon mirror 104 as described above.

Here, the maximum distance (a distance in the X direction between the light emitting part 102A at the outermost position P1 and the light emitting part 102A at the outermost position P4) of the light source 102 in the X direction (the sub-scanning direction) is set to ds [mm], emission angles of the laser beams B1 and B2 from the light emitting parts 102A at the outermost positions P1 and P4 in the X direction of the light source 102 are set to θs1 and θs2 (=0 [rad]), the maximum distance of the laser beams B on the polygon mirror 104 (the reflection surface 104B) in the Y direction is set to dp [mm], and incidence angles of the laser beams B1 and B2 at outermost positions in the X direction on the polygon mirror 104 (the reflection surface 104B) are θp$_{in}$1 [rad] and θp$_{in}$2 [rad]. In addition, in a case where the laser beams B1 and B2 are not differentiated from each other, an incidence angle is indicated by θp$_{in}$.

In addition, a focal length of the collimator lens 106 is set to f$_{col}$ [mm], a focal length of the cylindrical lens 108 is set to f$_{cyl}$ [mm], and a distance (inter-principal point distance) in the Z direction between the collimator lens 106 and the cylindrical lens 108 is set to dc [mm]. In addition, the laser beams B passing through the collimator lens 106 are assumed to form an image on the polygon mirror 104 in the sub-scanning direction by the cylindrical lens 108. In this case, Equations (1) and (2) are obtained from a paraxial calculation equation.

$$\frac{1}{2}dp = -\frac{1}{2}\frac{fcyl}{fcol}ds \qquad (1)$$

$$\theta p_{in} = \frac{1}{2}\left(-\frac{1}{fcyl} - \frac{\frac{-dc}{fcyl}+1}{fcol}\right)ds \qquad (2)$$

Configuration from Polygon Mirror to Photoconductor

Next, FIG. 6 is a schematic diagram illustrating an arrangement of the polygon mirror 104, the first fθ lens 112, the second fθ lens 114, and the photoconductor 14. In addition, the reflection mirror 116 (refer to FIG. 2) is not shown.

Here, the maximum distance of the laser beams B1 and B2 in the X direction (sub-scanning direction) on the photoconductor 14 (image plane) is set to do [mm], and incidence angles of the laser beams B1 and B2 from the light emitting parts 102A at the outermost positions P1 and P4 (refer to FIG. 5) in the X direction of the light source 102 to the photoconductor 14 are set to θo1 and θo2 (=0 [rad] which is a target). In addition, a focal length of the first fθ lens 112 is set to f1 [mm], a focal length of the second fθ lens 114 is set to f2 [ram], a distance (inter-principal point distance) in the Z direction between the polygon mirror 104 and the first DB lens 112 is set to d1 [mm], a distance (inter-principal point distance) between the first fθ lens 112 and the second fθ lens 114 is set to d2 [mm], and a distance (inter-principal point distance) between the second fθ lens 114 and the photoconductor 14 is set to d3 [mm].

In this case, Equations (3) and (4) are obtained from a paraxial calculation equation. In addition, an absolute value $|\theta p_{in}1|$ of the incidence angle of the laser beam B1 to the polygon mirror 104 is the same as an absolute value $|\theta p_{out}1|$ of an emission angle of the laser beams B from the polygon mirror 104. Similarly, an absolute value $|\theta p_{in}2|$ of the incidence angle of the laser beam B2 is the same as an absolute value $|\theta p_{out}2|$ of an emission angle of the laser beams B from the polygon mirror 104. In addition, $\theta p_{in}1$ and $\theta p_{in}2$ are not the same ($|\theta p_{in}1-\theta p_{in}2|>0$). In other words, the laser beams B1 and B2 are not incident in parallel to the reflection surfaces 104B of the polygon mirror 104. In addition, in Equations (3) and (4), simply $\theta o$ and $\theta p_{out}$ are shown without differentiating the laser beams B1 and B2 from each other.

$$\frac{1}{2} \cdot do = \frac{1}{2}\left(1 - \frac{d3}{f2} - \frac{\left(1-\frac{d3}{f2}\right) \cdot d2 + d3}{f1}\right) \cdot dp + \left(\left(1 - \frac{d3}{f2} - \frac{\left(1-\frac{d3}{f2}\right) \cdot d2 + d3}{f1}\right) \cdot d1 + \left(1 - \frac{d3}{f2}\right) \cdot d2 + d3\right) \cdot \theta p_{out} \quad (3)$$

$$\theta o = \frac{1}{2} \cdot \left(-\frac{1}{f2} - \frac{-\frac{d2}{f2}+1}{f1}\right) \cdot dp + \left(\left(-\frac{1}{f2} - \frac{-\frac{d2}{f2}+1}{f1}\right) \cdot d1 - \frac{d2}{f2} + 1\right) \cdot \theta p_{out} \quad (4)$$

Setting Condition on Photoconductor

In FIG. 6, when a resolution of a latent image after exposure on (outer circumferential surface of) the photoconductor 14 is set to D [dpi], and the number of laser beams B in the sub-scanning direction is set to n, the maximum distance do is obtained from Equation (5) at 1 inch, 25.4 [mm].

$$do = \frac{25.4}{D} \cdot (n-1) \quad (5)$$

Figure 8:
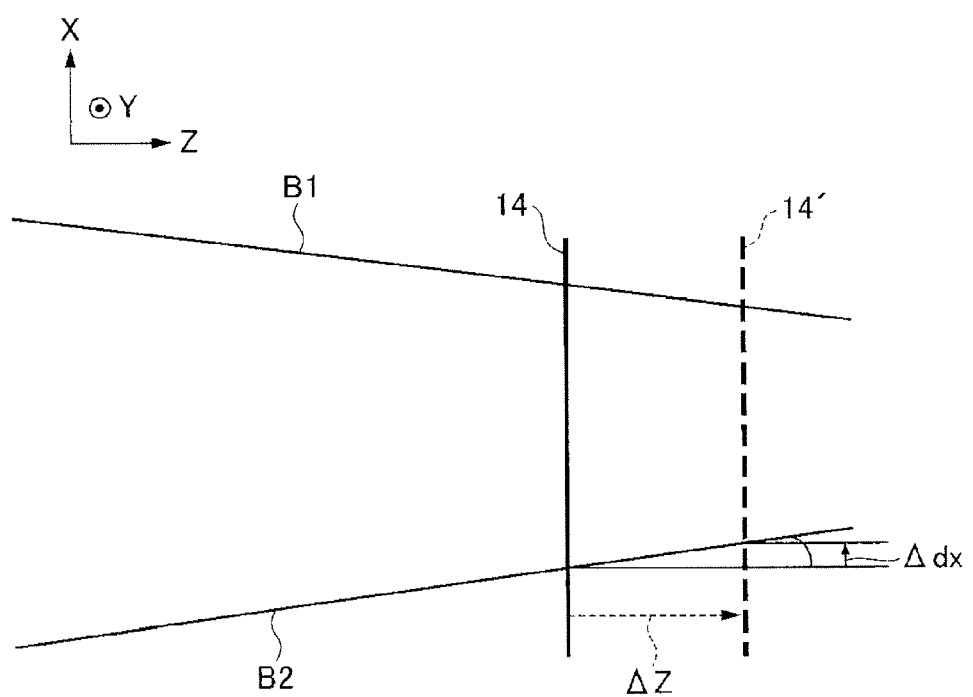
FIG. 8 is a schematic diagram illustrating a deviation amount of laser beams in a sub-scanning direction when the photoconductor according to the present exemplary embodiment is eccentric in a traveling direction of the beams.

As shown in FIG. 8, it is assumed that main light beams of the outermost laser beams B1 and B2 are incident to the photoconductor 14, and the photoconductor 14 becomes eccentric (an eccentric position is indicated by a photoconductor 14' with the broken line) in the light beam traveling direction (Z direction). For example, when an eccentric amount of the photoconductor 14 in the Z direction is 1 [mm], and a deviation amount of ¼ dot or more in the sub-scanning direction (X direction) is a deviation amount $\Delta dx$ [mm] which is visible to a user as an image, a condition in which it is difficult for a deviation in the X direction to be recognized is $\Delta dx<(25.4/D)\times(¼)$. Here, a condition of an incidence angle difference (deviation amount) $\Delta\theta o$ ($=\theta o1-\theta o2$) of the laser beams B1 and B2 to the photoconductor 14 in which it is difficult for a deviation in the X direction to be recognized is obtained from Equation (6).

$$\Delta\theta o < \tan^{-1}\left(\frac{25.4}{D} \cdot \frac{1}{4}\right) \quad (6)$$

When the focal lengths $f_{col}$, $f_{cyl}$, f1 and f2, and the inter-principal point distances dc, d1, d2 and d3 are determined using Equations (1), (2), (3) and (4) so as to satisfy Equations (5) and (6), parallel incidence (the incidence angle difference $\Delta\theta o=0$ [rad]) of the laser beams B1 and B2 to the photoconductor 14 is achieved. However, the inter-principal point distance d3 has a limitation of the lens width in the main scanning direction (longitudinal direction) as described above. In addition, as shown in FIG. 2, in the optical scanning device 100, Equation (6) is satisfied using an incidence range (indicated by S) of the laser beams B in the main scanning direction in the photoconductor 14. Here, the incidence range indicates a range which is practically used to form an image.

As an example of the setting of each parameter in the optical scanning device 100 according to the present exemplary embodiment, a value shown in Table 1 is set.

TABLE 1

| Parameter name | Unit | Value | Remarks |
|---|---|---|---|
| Maximum distance ds of light source | mm | 0.1382 | |
| Collimator lens focal length $f_{col}$ | mm | 23.30 | |
| Cylindrical lens focal length $f_{cyl}$ | mm | 42.12 | |
| Inter-principal point distance dc | mm | 114.9 | |
| Maximum distance dp in polygon | mm | −0.2498 | Equation (1) |
| Incidence angles $\theta p_{in}1$ and $\theta p_{in}2$ to polygon | rad | 0.0034 | Equation (2) |
| First fθ lens focal length f1 | mm | −77.19 | |
| Second fθ lens focal length f2 | mm | 48.76 | |
| Inter-principal point distance d1 | mm | 33.06 | |
| Inter-principal point distance d2 | mm | 51.65 | |
| Inter-principal point distance d3 | mm | 139.8 | |
| Curvature radius r1 on incidence side of first fθ lens | mm | −58.48 | |
| Curvature radius r2 on emission side of first fθ lens | mm | 159.0 | |
| Refractive index n1 of first fθ lens | | 1.538 | |
| Curvature radius r3 on incidence side of second fθ lens | mm | 56.82 | |
| Curvature radius r4 on emission side of second fθ lens | mm | −46.08 | |
| Refractive index n2 of second fθ lens | | 1.538 | |

As a result, results shown in Table 2 are obtained.

TABLE 2

| Parameter name | unit | value | Remarks |
|---|---|---|---|
| Maximum distance do in photoconductor (first) | mm | 0.3276 | Equation (3) |
| Maximum distance do in photoconductor (second) | mm | 0.3280 | Equation (5) |
| Incidence angle $\theta o1$ to photoconductor | rad | +8.333E−07 | Equation (4) |
| Incidence angle $\theta o2$ to photoconductor | rad | −8.333E−07 | Equation (4) |
| Upper limit of incidence angle $|\Delta\theta o|$ at 2400 dpi | rad | 0.152 | Equation (6) |

As shown in Table 2, the maximum distance in the photoconductor 14 obtained from Equation (3) becomes do=0.3276 [mm], the maximum distance in the photoconductor 14 obtained from Equation (5) becomes do=0.3280 [mm], and thus the two values are substantially the same within the error 1 μm. In addition, the incidence angle difference between the incidence angle $\theta o1$ (=+8.333E−07 [rad]) and the incidence angle $\theta o2$ (=−8.333E−07 [rad]) to the photoconductor 14 obtained from Equation (4) is $\Delta\theta o$=0, which is smaller than 0.152 which is a condition of the incidence angle difference $\Delta\theta o$ at 2400 dpi obtained from Equation (6), and thus satisfies the limitation condition on the photoconductor 14 (image plane).

Figure 10:
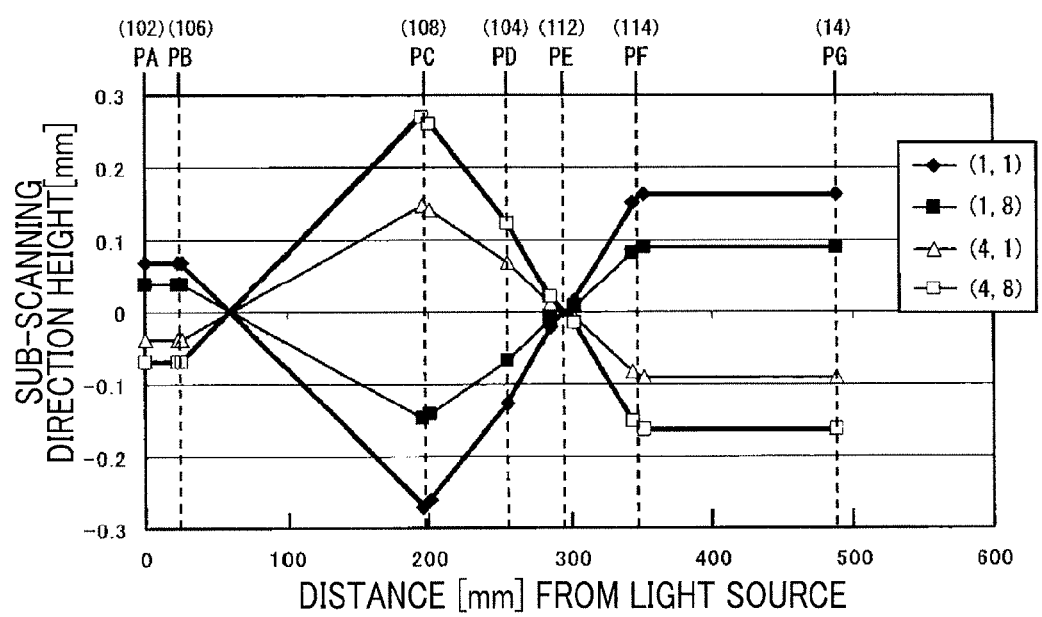
FIG. 10 is a graph illustrating a light path from plural light emitting parts to the photoconductor according to the present exemplary embodiment.

FIG. 10 shows variations in height in the sub-scanning direction with respect to distances from the light source 102, that is, light paths of the laser beams B. In addition, FIG. 10 shows light paths of the respective laser beams B emitted from P1 (1,1), P2 (1,8), P3 (4,1), and P4 (4,8) among the plural light emitting parts 102A (refer to FIG. 3) of the light source 102.

Further, FIG. 10 shows a position PA of the light source 102, a position PB of the collimator lens 106, a position PC of the cylindrical lens 108, a position PD of the polygon mirror 104, a position PE of the first fθ lens 112, a position PF of the second fθ lens 114, and a position PG of the photoconductor 14. Two plots are present in the traveling direction of the light at each of the positions PB, PC, PE and PF, and these respectively indicate data in the entrance surface and data in the reflection surface.

As can be seen from FIG. 10, the distance between the collimator lens 106 and the cylindrical lens 108 is adjusted, and the laser beams B are incident to the reflection surface 104B such that the optical axis directions of the laser beams B emitted from the plural light emitting parts 102A (refer to FIG. 3) are tilted with respect to the direction perpendicular to the reflection surface 104B (refer to FIG. 2). Thereby, parallel incidence of the laser beams B to the photoconductor 14 is achieved.

Here, the first fθ lens 112 and the second fθ lens 114 are made of plastic, and thus a pitch difference (BOW difference) between the beams occurs in the photoconductor 14 due to influence caused by tilting incidence angles of the laser beams B to the polygon mirror 104. For this reason, in the optical scanning device 100 according to the present exemplary embodiment, in order to maintain a paraxial state over the main scanning direction (in order to make a pitch difference constant), surfaces for independently changing a curvature in the sub-scanning direction are introduced into the first fθ lens 112 and the second fθ lens 114.

In the present exemplary embodiment, as an example, the entrance surface S1 of the first fθ lens 112 shown in FIG. 2 is set to an expanded y toric surface, the exit surface S2 of the first fθ lens 112 is set to an anamorphic aspherical surface, and the entrance surface S3 and the exit surface S4 of the second fθ lens 114 are set to an expanded y toric surface. Here, the entrance surface S1 and the exit surface S2 of the first fθ lens 112, and the entrance surface S3 and the exit surface S4 of the second fθ lens 114 are an example of the correction portion. In other words, the optical scanning device 100 corrects positional deviation in the sub-scanning direction by using the four surfaces (at least three surfaces) including the entrance surfaces S1 and S3 and the exit surfaces S2 and S4 of the first fθ lens 112 and the second fθ lens 114.

Configuration of y Toric Surface

Figure 11:
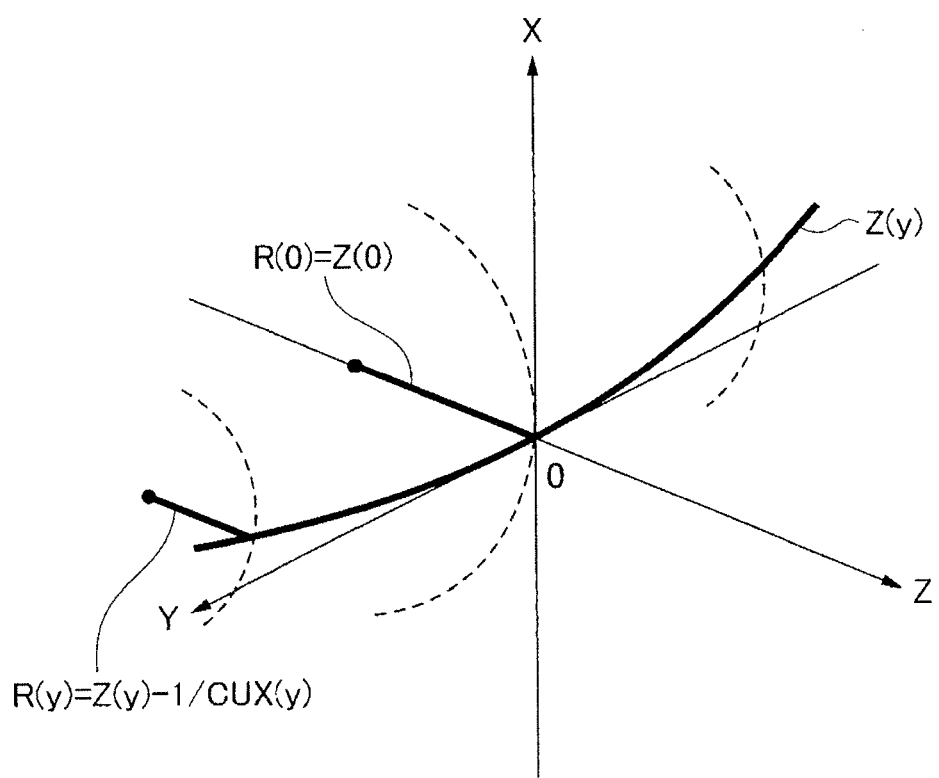
FIG. 11 is a schematic diagram illustrating a surface shape Z(y) of an expanded y toric surface in a first fθ lens and a second fθ lens according to the present exemplary embodiment.

In FIG. 11, a surface shape Z (y) of the y toric surface is indicated by the solid line. In addition, the y toric surface is a surface which has a constant curvature in the X direction, that is, in the sub-scanning direction, and is obtained by rotating a shape indicated by Z(y) of Equation (8) around the Y direction.

When a curvature in the X direction is indicated by CUX(y), and a curvature in the Y direction of the optical axis origin is indicated by CUY, an equation of a circle of Equation (7) is established for the surface shape Z(y) of the y toric surface. In addition, the surface shape Z(y) is also called sag.

$$\left(Z - \frac{1}{CUX(y)}\right)^2 + x^2 \left(\frac{1}{CUX(y)} - z(y)\right)^2 \quad (7)$$

In addition, the surface shape Z(y) of the y toric surface may be represented by Equation (8).

$$z(y) = \frac{CUY \cdot y^2}{1 + \sqrt{1 - (k+1)CUY^2 \cdot y^2}} + Ay^4 + By^6 + Cy^8 + Dy^{10} \quad (8)$$

In Equation (8), k is a conic constant, A is a fourth order coefficient, B is a sixth order coefficient, C is an eighth order coefficient, and D is a tenth order coefficient. In addition, the curvature CUX(y) in the X direction may be represented by Equation (9).

$$CUX(y) = CX0 + CX1 \cdot y + CX2 \cdot y^2 + CX3 \cdot y^3 + CX4 \cdot y^4 + CX5 \cdot y^5 + CX6 \cdot y^6 + CX7 \cdot y^7 + CX8 \cdot y^8 + CX9 \cdot y^9 + CX10 \cdot y^{10} \quad (9)$$

In Equation (9), CX0 is an integer, and CX1, CX2, CX3, CX4, CX5, CX6, CX7, CX8, CX9, and CX10 are respectively a first order coefficient to a tenth order coefficient.

Configuration of Expanded y Toric Surface

Here, since a curvature in the X direction (sub-scanning direction) may not be set independently in the y toric surface, an expanded y toric surface is introduced. The expanded y toric surface is a surface in which a curvature radius R(y) is defined by Equation (10) using Z(y) and the curvature CUX (y) in the X direction. In other words, the term 1/CUX(y) is added to the portion which may not be independently controlled in the y toric surface, and thereby independent control may be performed. In addition, positive and negative signs of the term 1/CUX(y) are changed depending on a way of taking coordinates, and, here, a negative sign is employed.

$$R(y) = z(y) - \frac{1}{CUX(y)} \quad (10)$$

Configuration of Anamorphic Aspherical Surface

When a paraxial curvature in the X direction is indicated by CUX, a paraxial curvature in the Y direction is indicated by CUY, a conic constant in the X direction is indicated by KX, a conic constant in the Y direction is indicated by KY, even order coefficients are indicated by AR, BR, CR, and DR, and odd order coefficients are indicated by AP, BP, CP, and DP, a surface shape Z of the anamorphic aspherical surface may be represented by Equation (11).

$$z = \frac{(CUX)x^2 + (CUY)y^2}{1 + \sqrt{1 - (1+KX)(CUX)^2x^2 - (1+KY)(CUY)^2y^2}} + \\ AR\{(1-AP)x^2 + (1+AP)y^2\}^2 + BR\{(1-BP)x^2 + (1+BP)y^2\}^3 + \\ CR\{(1-CP)x^2 + (1+CP)y^2\}^4 + DR\{(1-DP)x^2 + (1+DP)y^2\}^5 \quad (11)$$

Here, in the present exemplary embodiment, as an example, each parameter is set as in Table 3, for the entrance surface S1 of the first fθ lens 112, the entrance surface S3 of the second fθ lens 114, and the exit surface S4 of the second fθ lens 114. In addition, as an example, each parameter is set for the exit surface S2 of the first fθ lens 112 as in Table 4.

TABLE 3

| Parameter name | First fθ lens entrance surface S1 | Second fθ lens entrance surface S3 | Second fθ lens exit surface S4 |
|---|---|---|---|
| Y direction curvature CUY | −0.009 | −0.001 | 0.003 |
| Conic constant K | −0.148 | 43.8 | −199 |
| 4-th order A | 1.72E−06 | 3.22E−08 | −3.09E−07 |
| 6-th order B | −3.38E−10 | 1.40E−11 | 4.60E−11 |
| 8-th order C | −2.59E−14 | −2.56E−15 | −3.95E−15 |
| 10-th order D | 1.28E−17 | 8.72E−20 | 7.24E−20 |
| Constant CX0 | −0.017 | 0.018 | −0.022 |
| Coefficient CX1 | −5.62E−05 | −2.94E−05 | −3.18E−05 |
| Coefficient CX2 | −0.000 | −4.47E−06 | 2.15E−06 |
| Coefficient CX3 | −2.05E−08 | 1.11E−08 | 8.68E−09 |
| Coefficient CX4 | 1.76E−07 | 2.97E−09 | 4.93E−10 |
| Coefficient CX5 | 7.80E−11 | −1.40E−12 | −1.06E−12 |
| Coefficient CX6 | −1.16E−10 | −7.50E−13 | −3.62E−14 |
| Coefficient CX7 | −4.41E−14 | 9.96E−17 | 1.14E−16 |
| Coefficient CX8 | 3.99E−14 | 6.95E−17 | −2.53E−17 |
| Coefficient CX9 | 8.09E−18 | −2.04E−21 | −5.79E−21 |
| Coefficient CX10 | −5.65E−18 | −3.03E−21 | 1.81E−21 |

TABLE 4

| Parameter name | First fθ lens exit surface S2 |
|---|---|
| X direction curvature CUX | 0.006 |
| Y direction curvature CUY | −0.021 |
| Conic constant KY | −3.49 |
| Even order coefficient AR | −1.61E−05 |
| Even order coefficient BR | 4.11E−11 |
| Even order coefficient CR | −5.89E−14 |
| Even order coefficient DR | 3.34E−19 |
| Conic constant KX | 180 |
| Odd order coefficient AP | −0.648 |
| Odd order coefficient BP | 2.22 |
| Odd order coefficient CP | 0.658 |
| Odd order coefficient DP | 1.67 |

Table 5 shows, for the first fθ lens 112 (refer to FIG. 2), a curvature (1/r1) of the entrance surface S1, a curvature (1/r2) of the exit surface S2, a lens thickness t, and a lens power P at each scanning position in the main scanning direction. The lens power P is a reciprocal of the focal length f, and is obtained from Equation (12) using the refractive index n (=1.538), the curvature radius r1 of the entrance surface S1, the curvature radius r2 of the exit surface S2, and the lens thickness t.

$$P = \frac{1}{f} = (n-1)\left(\frac{1}{r1} - \frac{1}{r2}\right) + \frac{(n-1)^2}{n \times r1 \times r2} \times t \quad (12)$$

TABLE 5

| Main scanning position [mm] | Curvature (1/r1) [mm$^{-1}$] | Curvature (1/r2) [mm$^{-1}$] | Lens thickness t [mm] | Lens power P [mm$^{-1}$] |
|---|---|---|---|---|
| −45 | −0.0324 | −0.0571 | 5.88 | 0.0154 |
| −40 | −0.0408 | −0.0535 | 8.35 | 0.0103 |
| −35 | −0.0448 | −0.0441 | 10.6 | 0.0036 |
| −30 | −0.0450 | −0.0331 | 12.5 | −0.0029 |
| −25 | −0.0421 | −0.0224 | 14.2 | −0.0081 |
| −20 | −0.0367 | −0.0132 | 15.6 | −0.0113 |
| −15 | −0.0299 | −0.0056 | 16.7 | −0.0126 |
| −10 | −0.0233 | 0.0000 | 17.4 | −0.0126 |
| −5 | −0.0187 | 0.0035 | 17.9 | −0.0122 |
| 0 | −0.0172 | 0.0047 | 18.0 | −0.0121 |
| 5 | −0.0193 | 0.0035 | 17.9 | −0.0125 |
| 10 | −0.0246 | 0.0000 | 17.4 | −0.0132 |
| 15 | −0.0316 | −0.0056 | 16.7 | −0.0134 |
| 20 | −0.0387 | −0.0132 | 15.6 | −0.0123 |
| 25 | −0.0444 | −0.0224 | 14.2 | −0.0091 |
| 30 | −0.0473 | −0.0331 | 12.5 | −0.0040 |
| 35 | −0.0470 | −0.0441 | 10.6 | 0.0026 |
| 40 | −0.0426 | −0.0535 | 8.35 | 0.0095 |
| 45 | −0.0335 | −0.0571 | 5.88 | 0.0148 |

Figure 12A:
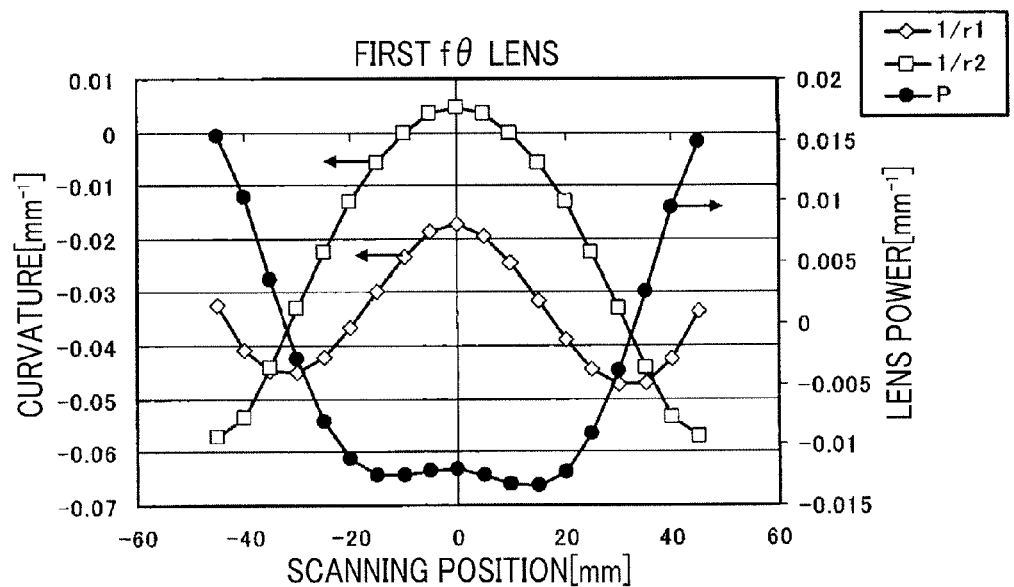
FIG. 12A is a graph illustrating a curvature and a lens power at each scanning position of the first fθ lens according to the present exemplary embodiment.

FIG. 12A shows graphs of the curvature (1/r1), the curvature (1/r2), and the lens power P relative to the main scanning positions.

On the other hand, Table 6 shows, for the second fθ lens 114 (refer to FIG. 2), a curvature (1/r3) of the entrance surface S3, a curvature (1/r4) of the exit surface S4, a lens thickness t, and a lens power P at each scanning position in the main scanning direction. The lens power P is a reciprocal of the focal length f, and is obtained from Equation (12) using the refractive index n (=1.538), the curvature radius r3 of the entrance surface S3, the curvature radius r4 of the exit surface S4, and the lens thickness t. In addition, in Equation (12), the curvature radius r1 is replaced with r3, and the curvature radius r2 is replaced with r4.

TABLE 6

| Main scanning position [mm] | Curvature (1/r3) [mm$^{-1}$] | Curvature (1/r4) [mm$^{-1}$] | Lens thickness t [mm] | Lens power P [mm$^{-1}$] |
|---|---|---|---|---|
| −90 | −0.0067 | −0.0260 | 6.05 | 0.0106 |
| −80 | 0.0051 | −0.0162 | 7.65 | 0.0113 |
| −70 | 0.0109 | −0.0132 | 8.90 | 0.0127 |
| −60 | 0.0132 | −0.0138 | 9.77 | 0.0142 |
| −50 | 0.0140 | −0.0157 | 10.2 | 0.0156 |
| −40 | 0.0146 | −0.0176 | 10.2 | 0.0169 |
| −30 | 0.0155 | −0.0192 | 9.96 | 0.0181 |
| −20 | 0.0165 | −0.0205 | 9.53 | 0.0193 |
| −10 | 0.0173 | −0.0214 | 9.15 | 0.0202 |
| 0 | 0.0175 | −0.0218 | 9.00 | 0.0205 |
| 10 | 0.0169 | −0.0218 | 9.15 | 0.0202 |
| 20 | 0.0157 | −0.0213 | 9.53 | 0.0194 |
| 30 | 0.0144 | −0.0205 | 9.96 | 0.0182 |
| 40 | 0.0132 | −0.0193 | 10.2 | 0.0170 |
| 50 | 0.0125 | −0.0176 | 10.2 | 0.0158 |
| 60 | 0.0116 | −0.0160 | 9.77 | 0.0145 |
| 70 | 0.0096 | −0.0152 | 8.90 | 0.0131 |
| 80 | 0.0044 | −0.0177 | 7.65 | 0.0118 |
| 90 | −0.0064 | −0.0267 | 6.05 | 0.0111 |

Figure 12B:
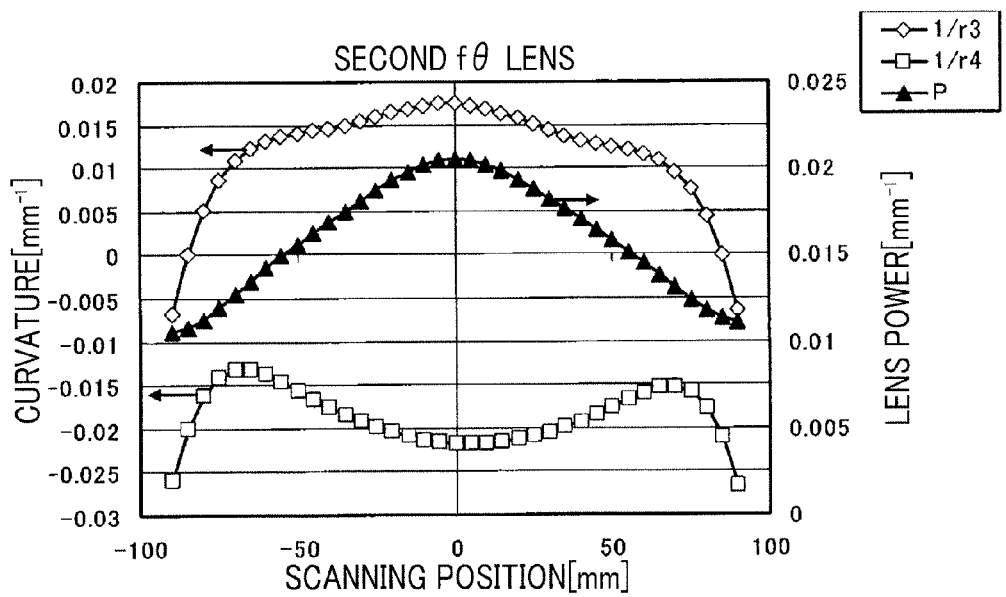
FIG. 12B is a graph illustrating a curvature and a lens power at each scanning position of the second fθ lens according to the present exemplary embodiment.

FIG. 12B shows graphs of the curvature (1/r3), the curvature (1/r4), and the lens power P relative to the main scanning positions. In addition, in the graphs of FIG. 12B, plots are displayed every 5 mm of the main scanning positions, but, in Table 6, some data is omitted, and data is shown every 10 mm.

As shown in FIG. 12A, in the first fθ lens 112, the curvature (1/r1) and the curvature (1/r2) are set to be changed in the main scanning direction, and thereby the lens power P in the sub-scanning direction increases toward the end part in the main scanning direction.

On the other hand, as shown in FIG. 12B, in the second fθ lens 114, the curvature (1/r3) and the curvature (1/r4) are set to be changed in the main scanning direction, and thereby the lens power P in the sub-scanning direction decreases toward the end part in the main scanning direction. In other words, in the present exemplary embodiment, each surface shape of the entrance surface S1 and the exit surface S2 of the first fθ lens 112, and the entrance surface S3 and the exit surface S4 of the second fθ lens 114, shown in FIG. 2, is independently changed, and thereby pitch deviation in the sub-scanning direction on the photoconductor 14 is corrected. In addition, a curvature in the sub-scanning direction at the position of the optical axis in the main scanning direction is different from a curvature in the sub-scanning direction at the position distant from the optical axis in the main scanning direction.

Operation

Next, an operation of the present exemplary embodiment will be described.

As shown in FIGS. 2, 5, 6 and 10, in the optical scanning device 100, the laser beams B which are emitted from the light source 102 and pass through the collimator lens 106 and the cylindrical lens 108 are incident to and reflected by the reflection surface 104B in a state in which optical axes thereof are tilted with respect to the surface perpendicular to the reflection surface 104B. In addition, the laser beams B reflected by the reflection surface 104B pass through the optical system 110 (the first fθ lens 112 and the second fθ lens 114) and are incident in parallel to the photoconductor 14.

Here, in the optical scanning device 100, although the first fθ lens 112 and the second fθ lens 114 made of plastic (resin) are used, correction in the sub-scanning direction is performed using the entrance surfaces S1 and S3 and the exit surfaces S2 and S4, and thus deviation of imaging positions in the sub-scanning direction on the photoconductor 14 is corrected. Thereby, positional deviation of the scanning lines in the sub-scanning direction on the photoconductor 14 is suppressed.

Next, evaluation and calculation results of characteristics including an imaging characteristic in the optical scanning device 100 will be described.

Figure 13A:
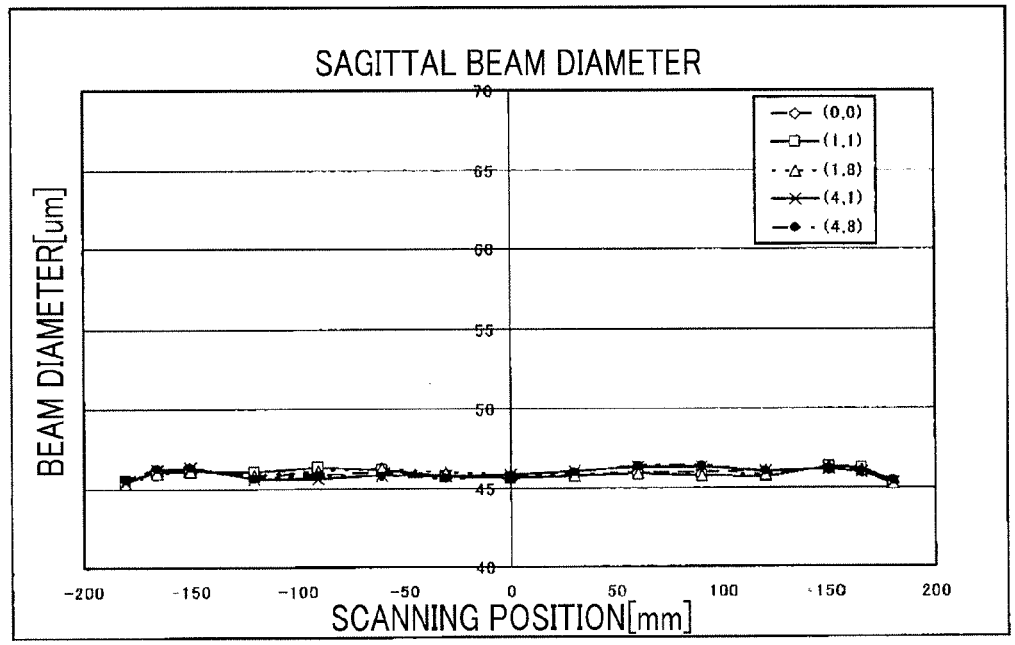
FIG. 13A is a graph illustrating a sagittal beam diameter on the photoconductor of each light emitting part according to the present exemplary embodiment.

FIG. 13A shows beam diameters of the laser beams B in the sagittal plane at the scanning positions (the positions in the main scanning direction) for the respective light emitting parts 102A (P1, P2, P3, and P4 of FIG. 3). As can be seen from the graph of FIG. 13A, the beam diameters almost do not vary in the main scanning direction and are about 46 [μm] for the respective light emitting parts 102A. In addition, in the subsequent calculation result, (0,0) indicates a result obtained when the light emitting part 102A is disposed at the origin P0.

Figure 13B:
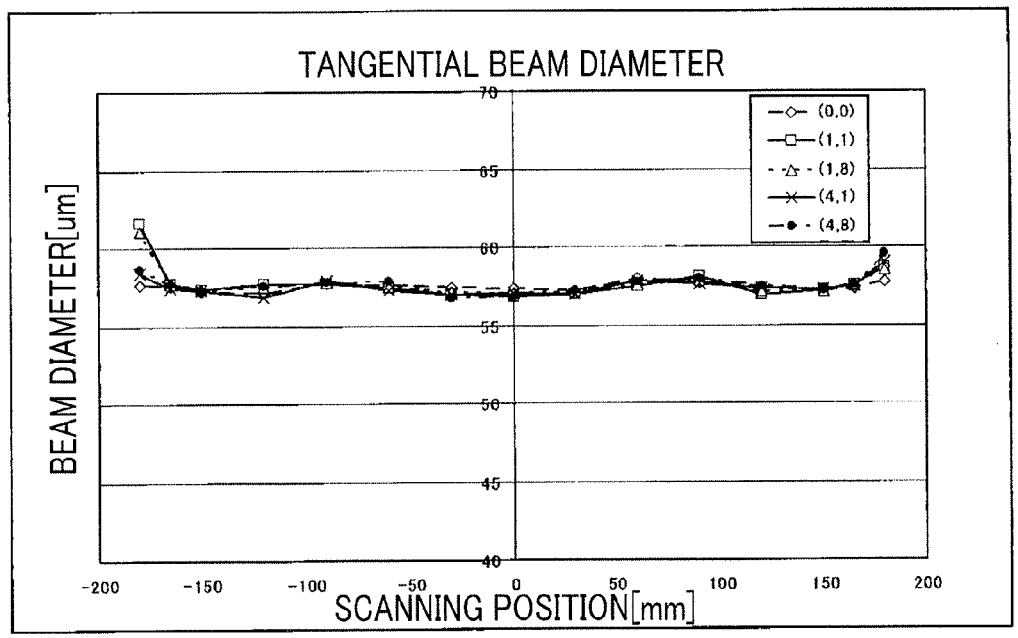
FIG. 13B is a graph illustrating a tangential beam diameter on the photoconductor of each light emitting part according to the present exemplary embodiment.

FIG. 13B shows beam diameters of the laser beams B in the tangential plane perpendicular to the sagittal plane at the scanning positions (the positions in the main scanning direction) for the respective light emitting parts 102A (P1, P2, P3, and P4 of FIG. 3). As can be seen from the graph of FIG. 13B, the beam diameters almost do not vary in the main scanning direction and are about 57 [μm] for the respective light emitting parts 102A.

Figure 14A:
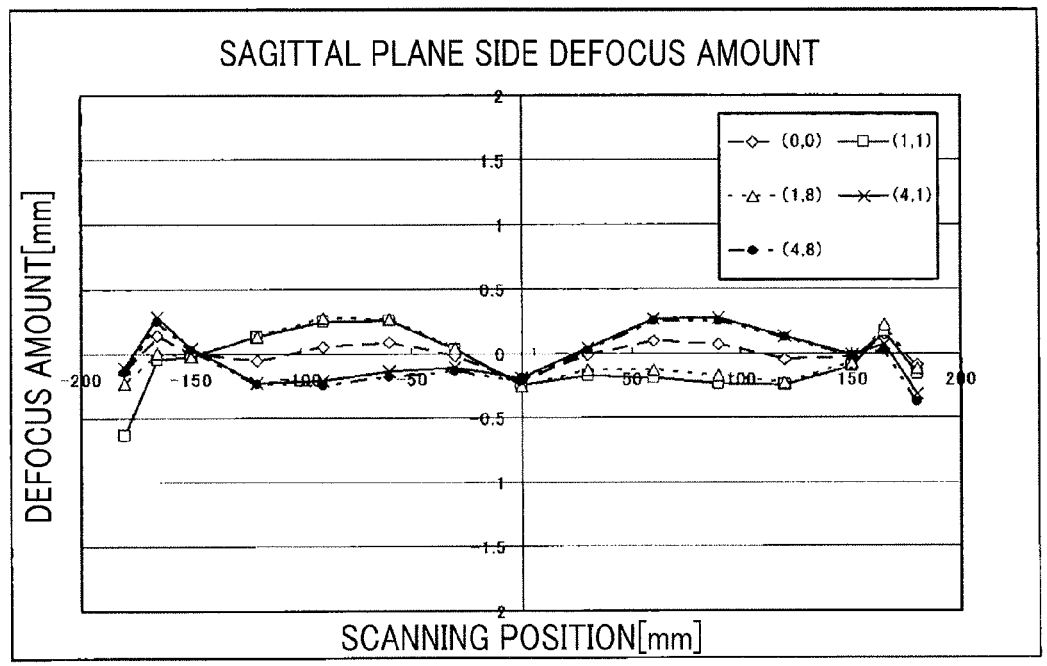
FIG. 14A is a graph illustrating a defocus amount on a sagittal plane side of each light emitting part according to the present exemplary embodiment.
Figure 14B:
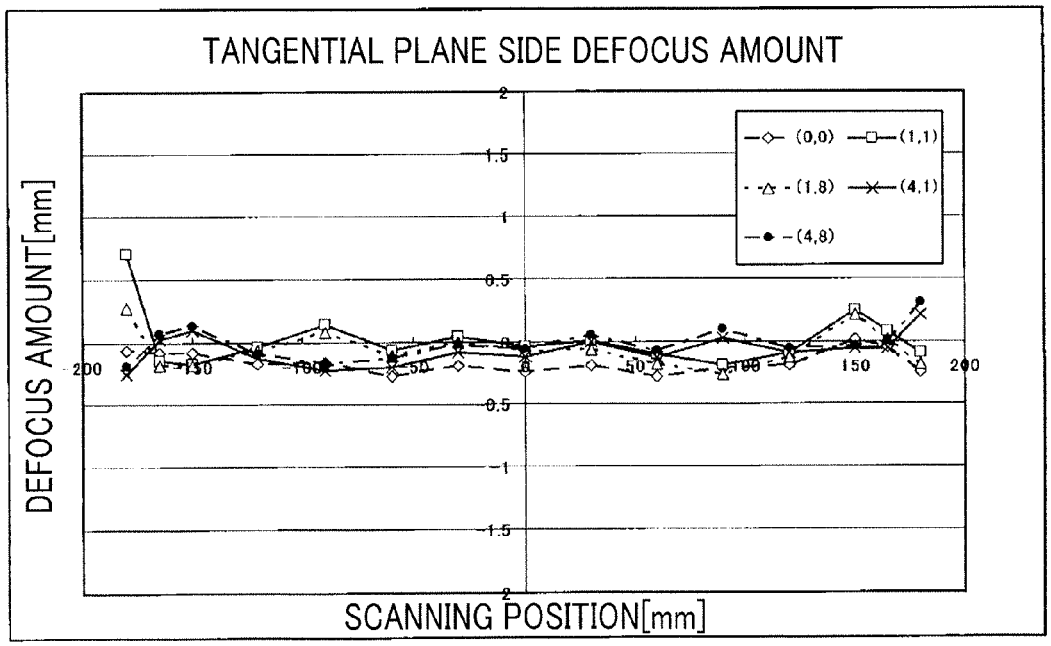
FIG. 14B is a graph illustrating a defocus amount on a tangential plane side of each light emitting part according to the present exemplary embodiment.

FIGS. 14A and 14B show defocus amounts [mm] on the sagittal plane and tangential plane when a central position in the main scanning direction is 0 [mm], that is, image plane bending characteristics. As can be seen from the graphs shown in FIGS. 14A and 14B, defocus amounts in all the light emitting parts 102A (P1, P2, P3, and P4 of FIG. 3) are restricted to 1.0 [mm] or less at P-P (from the negative minimum value to the positive maximum value).

Figure 15A:
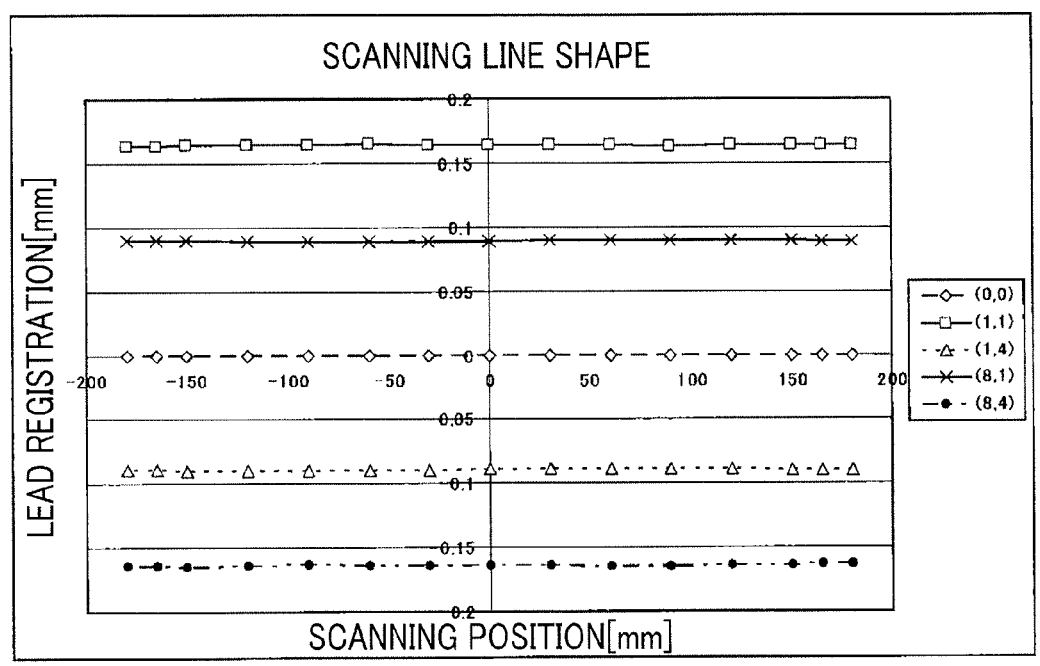
FIG. 15A is a graph illustrating lead registration of each light emitting part according to the present exemplary embodiment.

FIG. 15A shows graphs of beginning positions (also referred to as lead registration) of scanning lines in the sub-scanning direction at the respective scanning positions (the positions in the main scanning direction) as evaluation of a scanning beam shape. As can be seen from the graphs shown in FIG. 15A, a disparity in the lead registration is suppressed in all the light emitting parts 102A (P1, P2, P3, and P4 of FIG. 3).

Figure 15B:
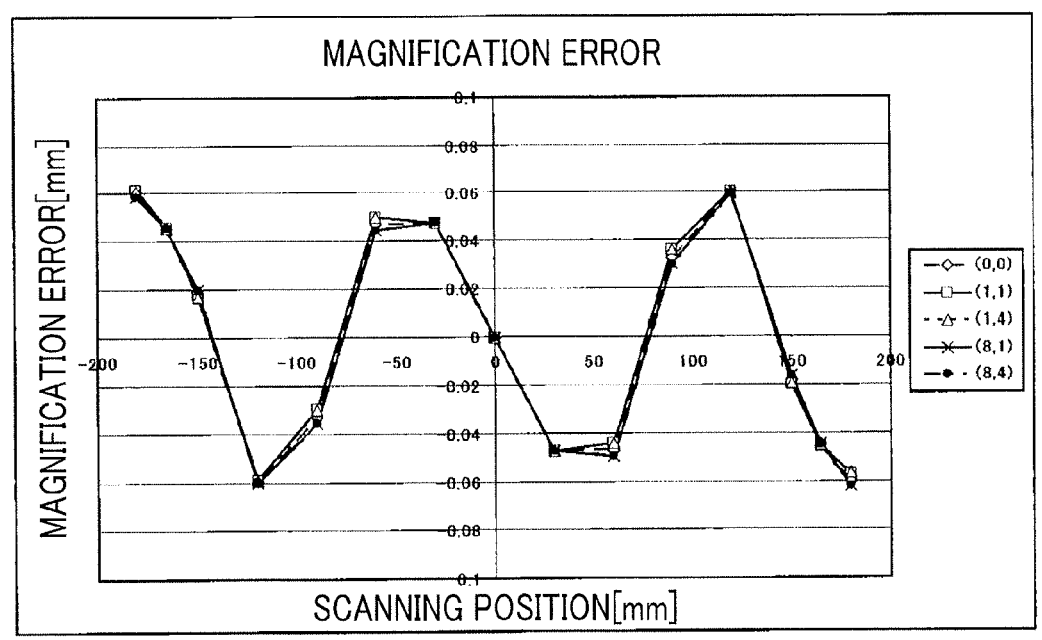
FIG. 15B is a graph illustrating a magnification error of each light emitting part according to the present exemplary embodiment.

FIG. 15B shows graphs of magnification errors (a positional deviation; indicating linearity) of the laser beams B at the respective scanning positions (the positions in the main scanning direction) when the magnification error is 0 assuming that the laser beams B maintain uniform motion. As can be seen from the graphs shown in FIG. 15B, deviation amounts in all the light emitting parts 102A (P1, P2, P3, and P4 of FIG. 3) are restricted to ±0.08 [mm] or less, and thus there is no problem in practical use.

Figure 16A:
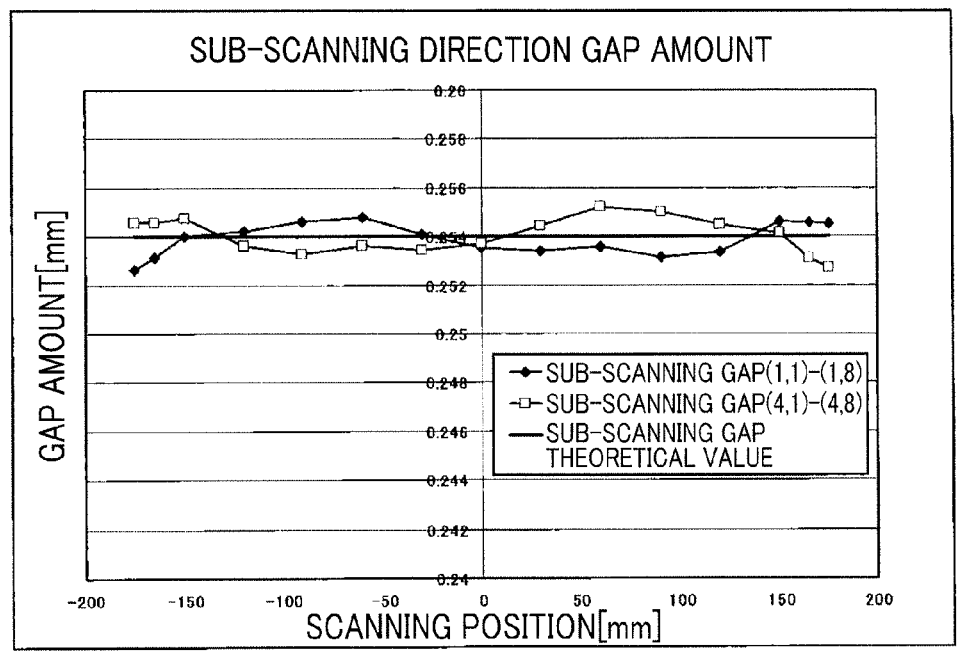
FIG. 16A is a graph illustrating a gap amount in a sub-scanning direction of each light emitting part according to the present exemplary embodiment.

FIG. 16A shows graphs of a gap amount (deviation amount) in the sub-scanning direction between P1 and P2 (refer to FIG. 3) of the light emitting parts 102A and a gap amount (deviation amount) in the sub-scanning direction between P3 and P4 (refer to FIG. 3) of the light emitting parts 102A at the respective scanning positions (the positions in the main scanning direction). As can be seen from the graphs shown in FIG. 16A, the gap amounts in the sub-scanning direction between P1 and P2, and P3 and P4 of the light emitting parts 102A are values close to a theoretical value 0.254 [mm] of a gap amount in the sub-scanning direction.

Figure 16B:
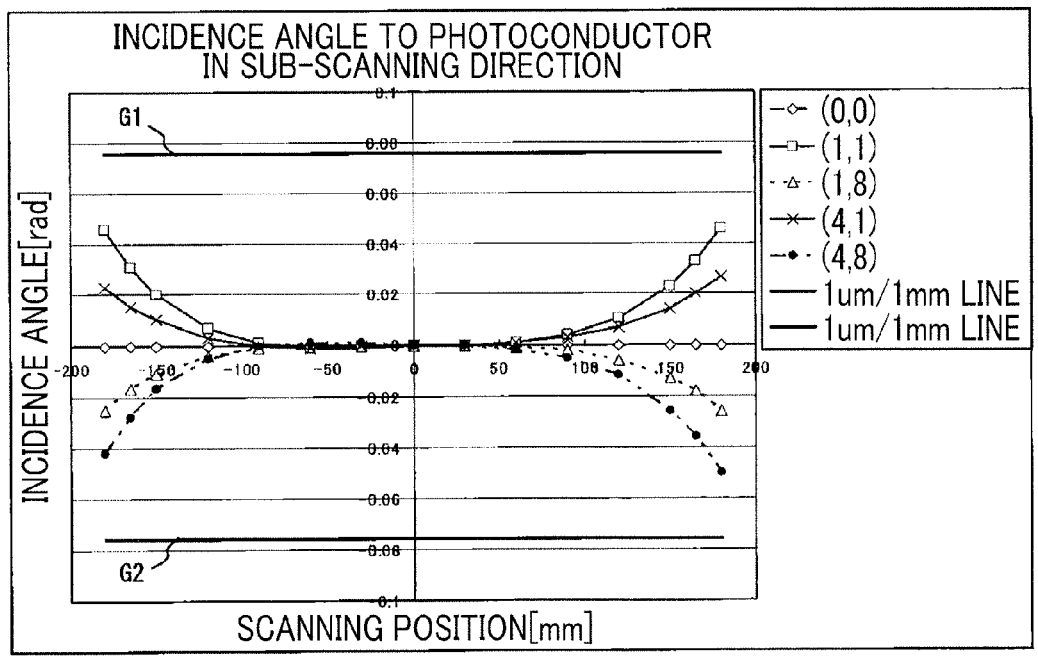
FIG. 16B is a graph illustrating an incidence angle at which laser beams emitted from each light emitting part according to the present exemplary embodiment are incident to the photoconductor in the sub-scanning direction.

FIG. 16B shows graphs of incidence angles [rad] to the photoconductor 14 (refer to FIG. 2) in the sub-scanning direction at the scanning positions for the respective light emitting parts 102A (P1, P2, P3, and P4 of FIG. 3). In addition, the graph indicated by the thick solid line in the drawing indicates an incidence angle which is deviated by 1 [μm] in the sub-scanning direction when the photoconductor 14 becomes eccentric by 1 [mm] in the traveling direction (Z direction) of the laser beams B.

As can be seen from the graphs shown in FIG. 16B, the respective light emitting parts 102A are substantially parallel (an incidence angle is substantially 0 [rad]) to the photoconductor 14 in the range of ±100 [mm]. In addition, it can be seen that, in the range of the scanning position from +100 [mm] to +200 [mm], and the range thereof from −100 [mm] to −200 [mm], an incidence angle is deviated from 0 [rad], but lies in a range (the maximum incidence angle deviation amount is within 0.152 [rad], that is, ±0.076 [rad]) of an incidence angle which is deviated by 1 [μm] in the sub-scanning direction when the photoconductor 14 becomes eccentric by 1 [mm] in the Z direction, and thus there is no problem in practical use.

As described above, in the optical scanning device 100, although the first fθ lens 112 and the second fθ lens 114 made of plastic are used for the optical system 110, incidence angles of the laser beams B to the reflection surface 104B of the polygon mirror 104 are tilted angles with respect to the surface perpendicular to the reflection surface 104B, and thereby the incidence angles of the laser beams B to the photoconductor 14 become substantially parallel.

In other words, since the incidence angle difference Δθo between the incidence angle θo1 of the laser beam B1 from the light emitting part 102A at the outermost position P1 to the photoconductor 14 and the incidence angle Δo2 of the laser beam B2 from the light emitting part 102A at the outermost position P4 to the photoconductor 14 satisfies Equation (6), an image is favorably formed in a state in which deviation of the scanning lines between the respective laser beams B (the respective light emitting parts 102A) is small. In addition, since the entrance surface S1 and the exit surface S2 of the first fθ lens 112 and the entrance surface S3 and the exit surface S4 of the second fθ lens 114 have surface shapes which are adjusted independently, positional deviation of scanning lines in the sub-scanning direction on the photoconductor 14 is suppressed.

In addition, in the optical scanning device 100, the optical system 110 is constituted by only the first fθ lens 112 and the second fθ lens 114 made of plastic (resin) except for the reflection mirror 116, and thus the number of components is reduced compared with other cylindrical lenses. In addition, costs are small compared with a configuration of using a lens made of glass. Further, since the first fθ lens 112 and the second fθ lens 114 are made of plastic (resin), aspherical surfaces of the entrance surfaces S1 and S3 and the exit surfaces S2 and S4 are easily manufactured.

In addition, in the optical scanning device 100, since the incidence angle difference Δθo of the laser beams B1 and B2 emitted from the two light emitting parts 102A at the outermost positions in the sub-scanning direction to the photoconductor 14 satisfies Equation (6), positional deviation of scanning lines is further suppressed than a case of not satisfying Equation (6).

In addition, in the optical scanning device 100, since the maximum incidence angle deviation amount of the plural laser beams B on the photoconductor 14 is within ±0.076 [rad], positional deviation of scanning lines in the sub-scanning direction on the photoconductor 14 is suppressed.

In addition, in the optical scanning device 100, since the entrance surface S1 and the exit surface S2 of the first fθ lens 112 and the entrance surface S3 and the exit surface S4 of the second fθ lens 114 are independently set, and a curvature radius of each surface is represented by Equation (10), positional deviation of scanning lines in the sub-scanning direction on the photoconductor 14 is suppressed.

In addition, in the image forming apparatus 10, since positional deviation of scanning lines in the sub-scanning direction on the photoconductor 14 is corrected by the optical scanning device 100, deviation of exposure positions during exposure is suppressed, and thus a poor image is suppressed when an image is formed.

In addition, the invention is not limited to the above-described exemplary embodiment.

The image forming apparatus 10 may be a direct transfer type image forming apparatus which does not include the intermediate transfer belt 24, or may have other configurations as long as the image forming apparatus includes the photoconductor 14 and the optical scanning device 100 scanning the surface of the photoconductor 14 with light.

A correction portion of BOW is not limited to the entrance surface S1 and the exit surface S2 of the first fθ lens 112 and the entrance surface S3 and the exit surface S4 of the second fθ lens 114, and may be three surfaces among them. In addition, as a correction portion of BOW, in addition to the first fθ lens 112 and the second fθ lens 114, the reflection mirror 116 may be used as a cylindrical mirror, and BOW may be corrected using the cylindrical mirror.

The number of light emitting parts 102A of the light source 102 is not limited to thirty-two (=4×8), and may be other numbers.

Each parameter described in the exemplary embodiment is an example, and other values may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical scanning device comprising:
a light source that includes a string of a plurality of light emitting parts provided with a gap in a main scanning direction of a surface to be scanned, is disposed in plurality in a sub-scanning direction and emits light beams;
a light source amount correction unit that corrects an amount of light emitted by the light source based on a portion of detected light;
a scanning portion that includes a plurality of reflection surfaces arranged in a circumferential direction with respect to a rotation axis, makes the light beams incident to the reflection surface such that optical axis directions of the light beams emitted from the plurality of light emitting parts are tilted with respect to a direction perpendicular to the reflection surface, and scans the light beams in the main scanning direction through rotation;
an optical system that includes an optical member made of a resin, is disposed between the scanning portion and the surface to be scanned, and makes the plurality of light beams incident to the surface to be scanned such that optical axes of the plurality of light beams are parallel to each other; and
a correction portion that is provided in the optical system, and corrects positional deviation of scanning lines of the light beams in the sub-scanning direction on the surface to be scanned,
wherein the optical system includes the optical member made of a resin in plurality,
wherein, in the correction portion, at least three surfaces of entrance surfaces and exit surfaces of the plurality of optical members have curvatures in the sub-scanning direction at positions of the optical axes in the main scanning direction which are different from curvatures in the sub-scanning direction at positions distant from the optical axes in the main scanning direction, and
wherein a curvature radius R(y) of at least three surfaces of the entrance surfaces and the exit surfaces is represented by Equation (10) when a surface shape in the main scanning direction at the position of the optical axis in the sub-scanning direction is indicated by Z(y) represented by Equation (8), and a curvature in an X direction, that is, in the sub-scanning direction, is indicated by CUX(y) represented by Equation (9), where CX0 is an integer, and CX1, CX2, CX3, CX4, CX5, CX6, CX7, CX8, CX9, and CX10 are respectively a first order coefficient to a tenth order coefficient $$z(y) = \frac{CUY \cdot y^2}{1 + \sqrt{1 - (k+1)CUY^2 \cdot y^2}} + Ay^4 + By^6 + Cy^8 + Dy^{10} \quad (8)$$

$$CUX(y) = CX0 + CX1 \cdot y + CX2 \cdot y^2 + CX3 \cdot y^3 + CX4 \cdot y^4 + \\ CX5 \cdot y^5 + CX6 \cdot y^6 + CX7 \cdot y^7 + CX8 \cdot y^8 + CX9 \cdot y^9 + CX10 \cdot y^{10} \quad (9)$$

$$R(y) = z(y) - \frac{1}{CUX(y)}. \quad (10)$$

2. The optical scanning device according to claim 1, wherein, when incidence angles of light beams emitted from two of the light emitting parts located at outermost positions in the sub-scanning direction to the reflection surface are respectively indicated by θp$_{in}$1[rad] and θp$_{in}$2[rad], |θp$_{in}$1−θp$_{in}$2|>0, incidence angles of the light beams emitted from the two light emitting parts located at the outermost positions in the sub-scanning direction to the surface to be scanned are respectively indicated by θo1[rad] and θo2[rad], and a resolution in the surface to be scanned is indicated by D[dpi], an incidence angle difference Δθo[rad] of the plurality of light beams in the sub-scanning direction which is a difference between the incidence angle θo1 and the incidence angle θo2 satisfies Equation (6)

$$\Delta\theta o < \tan^{-1}\left(\frac{25.4}{D} \cdot \frac{1}{4}\right). \quad (6)$$

3. The optical scanning device according to claim 2, wherein Equation (6) is satisfied in an incidence range of light to the surface to be scanned in the main scanning direction.

4. An image forming apparatus comprising:
a photoconductor that is the surface to be scanned of which an outer circumferential surface is charged;
the optical scanning device according to claim 2 that scans light beams on the outer circumferential surface of the photoconductor; and
an image forming portion that develops a latent image on the photoconductor formed by the light beams from the optical scanning device with a developer, and transfers a developed image to a recording medium so as to form an image.

5. An image forming apparatus comprising:
a photoconductor that is the surface to be scanned of which an outer circumferential surface is charged;
the optical scanning device according to claim 1 that scans light beams on the outer circumferential surface of the photoconductor; and
an image forming portion that develops a latent image on the photoconductor formed by the light beams from the optical scanning device with a developer, and transfers a developed image to a recording medium so as to form an image.

* * * * *